United States Patent [19]

Ohta et al.

[11] Patent Number: 5,143,951

[45] Date of Patent: Sep. 1, 1992

[54] EPOXY RESIN COMPOSITION FOR SEMICONDUCTOR SEALING

[75] Inventors: Ken Ohta; Wataru Kosaka; Kenichi Yanagisawa, all of Utsunomiya, Japan

[73] Assignee: Sumitomo Bakelite Company Limited, Tokyo, Japan

[21] Appl. No.: 603,076

[22] Filed: Oct. 25, 1990

[30] Foreign Application Priority Data

| Nov. 22, 1989 | [JP] | Japan | 1-301973 |
| Nov. 22, 1989 | [JP] | Japan | 1-301974 |
| Nov. 22, 1989 | [JP] | Japan | 1-301975 |
| Nov. 30, 1989 | [JP] | Japan | 1-309303 |
| Feb. 22, 1990 | [JP] | Japan | 2-039603 |

[51] Int. Cl.$^5$ ............... C08F 283/10; C08F 283/12; C08G 77/38; C08G 77/04
[52] U.S. Cl. ............... 523/435; 525/476; 528/33; 523/466; 523/457
[58] Field of Search ............... 525/476, 435; 528/33

[56] References Cited

U.S. PATENT DOCUMENTS

| 3,635,843 | 1/1972 | Parry et al. |
| 4,720,515 | 1/1988 | Iji et al. ............... 523/400 |

FOREIGN PATENT DOCUMENTS

| 0342512 | 5/1988 | European Pat. Off. |
| 61-73725 | 4/1986 | Japan. |
| 61-168620 | 7/1986 | Japan. |
| 62-174222 | 7/1987 | Japan. |

OTHER PUBLICATIONS

Patent Abstracts of Japan, vol. 10, No. 239 (C-367)(2295) Aug. 19, 1986 & JP-A-1 073 725 (Denki Kagaku KK) Apr. 15, 1986 *abstract*.
World Patents Index Latest Derwent Publications Ltd., London, GB; AN 89-280905 & JP-A-1 203 423 (Matsushita) Aug. 16, 1989 *abstract*.
Patent Abstracts of Japan vol. 13, No. 61 (C-567)(3409) Feb. 10, 1989 & JP-A-63 251 419 (Toray Ind Inc.) Oct. 18, 1988 *abstract*.

*Primary Examiner*—Melvyn I. Marquis
*Assistant Examiner*—Christopher P. Rogers
*Attorney, Agent, or Firm*—Browdy and Neimark

[57] ABSTRACT

An epoxy resin composition for semiconductor sealing, comprising as essential components:
(A) an epoxy resin,
(B) a phenolic resin curing agent comprising 30–100% by weight, based on the total amount of the phenolic resin curing agent, of a silicone-modified phenolic resin curing agent obtained by reacting a phenolic resin with at least one of silicone compounds represented by the following formulas [I] and [II]

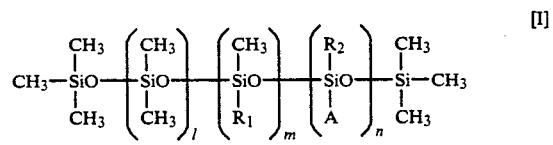

[I]

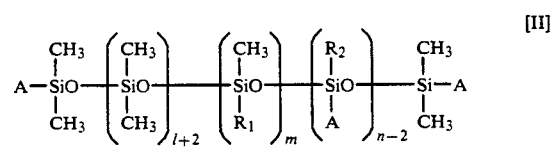

[II]

wherein

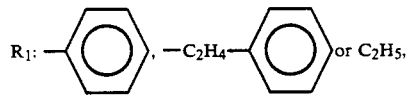

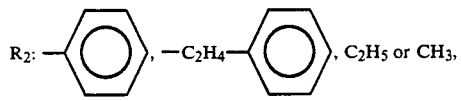

A: —R—COOH,

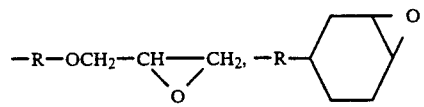

or H,
R: a lower alkylene group,
$10 \leq N = l+m+n+2 \leq 200$,
$0 \leq m/N \leq 0.1$, and $5 \leq N/n \leq 50$,
(C) an inorganic filler, and
(D) a curing accelerator.

22 Claims, No Drawings

EPOXY RESIN COMPOSITION FOR SEMICONDUCTOR SEALING

The present invention relates to an epoxy resin composition for semiconductor sealing, which is excellent in soldering heat resistance, thermal impact resistance and moldability.

Epoxy resins are excellent in heat resistance, electrical properties, mechanical strengths and adhesion, and find wide uses in coatings, adhesives, resins for sealing of electronic parts, resins for laminated plates and various other applications.

For example, in resin sealing of semiconductor devices (e.g., IC, LSI, transistor and diode), electronic circuits, etc., there are generally used epoxy resin compositions in view of the properties and cost of intended products.

In such resin sealing, however, there have been considered problems of (a) increase in package crack caused by temperature cycle and (b) increase in package crack caused by thermal impact of soldering during surface mounting, because of changes to larger IC size and smaller and thinner package size. Accordingly, effective measures for solving these problems are desired seriously.

For solving the problems, investigations are being made on (1) lower elastic modulus, (2) lower thermal expansion coefficient, (3) higher impact strength and (4) lower water absorbability.

With respect to the lower elastic modulus (1), it is said that the use of a silane-modified epoxy resin compound is effective [Japanese Patent Application Kokai (Laid-Open) No. 73725/1986 and Japanese Patent Application Kokai (Laid-Open) No. 174222/1987]. However, the adoption of a lower elastic modulus alone gives lower strength and hence lower heat resistance for soldering, and accordingly it was impossible to obtain a good resin composition for semiconductor sealing.

With respect to the lower thermal expansion coefficient (2), it is said that increasing the amount of silica filler used in a resin composition is effective. However, this approach brings about a problem of viscosity increase of the resin composition caused by increase in filler amount, and accordingly it was necessary to clear the significant reduction in moldability.

With respect to the higher impact strength (3), it is said that the use of a biphenyl type epoxy resin or a trifunctional epoxy resin [Japanese Patent Application Kokai (Laid-Open) No. 168620/1986] is effective. However, the use of any of these resins gives reduction in moldability, particularly reduction in thin flash property and mold staining property.

With respect to the lower water absorbability (4), it is said that the use of a silicone-modified resin or the increase in amount of filler used is effective. However, any of these approaches has the above-mentioned drawbacks and is not put into practical application.

The present invention has been made in view of the above situation and is intended to provide an epoxy resin composition for semiconductor sealing, which is satisfactory in all of soldering heat resistance, thermal impact resistance and moldability.

The present inventors made extensive study in order to obtain an epoxy resin composition for semi-conductor sealing, which is free from the drawbacks of the prior art and has excellent balanced properties. As a result, it was found that an epoxy resin composition obtained by incorporating into (A) an epoxy resin, (B) a phenolic resin curing agent comprising 30-100% by weight, based on the total amount of the phenolic resin curing agent, of a silicone-modified phenolic resin curing agent obtained by reacting a phenolic resin with at least one of silicone compounds represented by the following formulas [I] and [II] capable of imparting remarkably high toughness and low elasticity without sacrifying moldability,

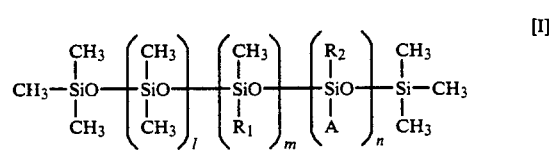

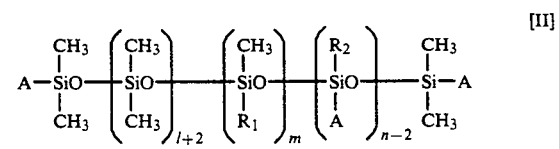

wherein

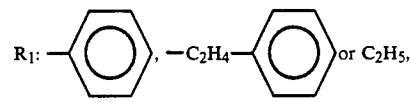

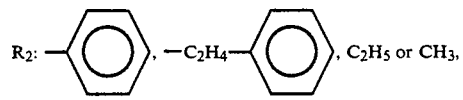

A: —R—COOH,

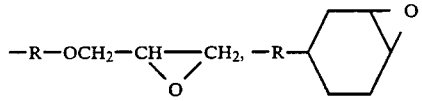

or H,
R: a lower alkylene group,
$10 \leq N = l+m+n+2 \leq 200$,
$0 \leq m/N \leq 0.1$, and $5 \leq N/n \leq 50$, (C) an inorganic filler and (D) a curing accelerator, and give sufficient improvements in all of moldability, soldering heat resistance and thermal impact resistance, even to thin and large chip packages. The above finding had led to the completion of the present invention.

The first preferable embodiment of the present invention consists of an epoxy resin composition as mentioned above, wherein the epoxy resin comprises 30-100% by weight, based on the total amount of the epoxy resin, of at least one epoxy compound selected from the group consisting of naphthalene type epoxy compounds represented by the following formula [III] and biphenyl type epoxy compounds represented by the following formula [IV] all effective for obtaining improved impact strength and lower viscosity

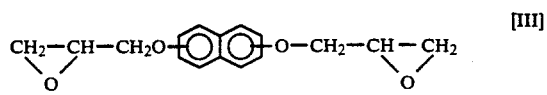

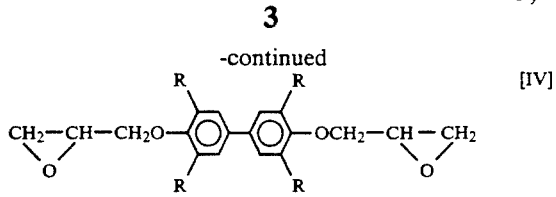

wherein R:H or CH$_3$, and the inorganic filler is used in an amount of 70-90% by weight based on the total amount of the composition.

The second preferable embodiment of the present invention consists of an epoxy resin composition as mentioned above, wherein the epoxy resin comprises 50-100% by weight, based on the total amount of the epoxy resin, of a mixture of a biphenyl type epoxy resin represented by the following formula [IV] effective for obtaining improved thermal impact resistance and lower viscosity

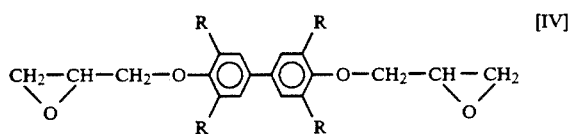

wherein R:H or CH$_3$, and a trifunctional epoxy resin represented by the following formula [V] effective for obtaining improved heat resistance for soldering

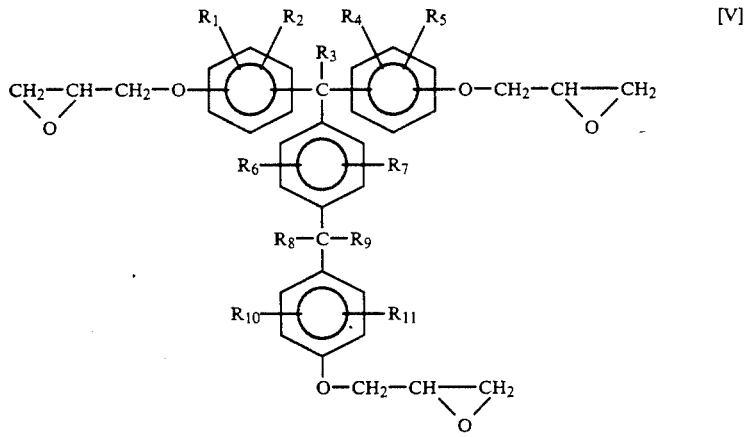

wherein R$_1$ to R$_{11}$ are each an atom or an atomic group selected from hydrogen, halogens and alkyl groups.

The epoxy resin used in the present invention as the component (A) can be any epoxy resin as long as it has at least two epoxy groups in the molecule. As the epoxy resin, there can be cited, for example, bisphenol A type epoxy resins, bisphenol F type epoxy resins, phenol novolac type epoxy resins, cresol novolac type epoxy resins, alicyclic epoxy resins and resins obtained by modifying them. These epoxy resins can be used alone or in admixture of two or more.

Of these epoxy resins, preferable are those having an epoxy equivalent of 150-250 and a softening point of 60-130° C. and containing ionic impurities such as Na$^+$, Cl$^-$ and the like in amounts as small as possible.

The naphthalene type epoxy resin represented by the formula [III] and the biphenyl type epoxy resin represented by the formula [IV] both used in the first preferable embodiment of the present invention have a viscosity as low as several centipoises at the molding temperature (165-185° C.) of the present resin composition, and accordingly can reduce the viscosity of the composition significantly. Therefore, the use of these epoxy resins can significantly increase the amount of filler used in the resin composition, as compared with the usual level.

These epoxy compounds, having a planar structure and being dense in molecular packing, can allow the resulting resin composition to have improved impact strength and excellent thermal impact resistance, soldering heat resistance and moisture resistance after soldering.

However, the epoxy resin comprising these epoxy compounds in a total amount of 30% by weight or more, is inferior in reactivity and compatibility with other resins and has low viscosity; therefore, the resin has had a problem of allowing the resulting resin composition to have reduced moldability, particularly, reduced thin flash property and mold staining property.

The problem, however, could be cleared by using the above-mentioned silicone-modified phenolic resin in combination.

The naphthalene type epoxy compound represented by the formula [III], or the biphenyl type epoxy compound represented by the formula [IV], or a mixture thereof may be mixed with other epoxy resins; however, the amount of the compound [III] or the compound [IV] or the mixture in the total epoxy resin amount is preferably 30% by weight or more.

When the amount is less than 30% by weight, it is difficult to obtain sufficiently low viscosity, low water absorbability and high impact strength, and the resulting resin composition has relatively insufficient soldering heat resistance and fluidity.

When the naphthalene type epoxy resin represented by the formula [III] and the biphenyl type epoxy resin represented by the formula [IV] are used in combination, it is preferable that the former and the latter be used at a weight ratio of 10/90 to 90/10.

The naphthalene type epoxy compound has high reactivity and gives increased strength, and accordingly can give improved soldering heat resistance. However, the compound has no sufficient thermal impact resistance and moreover is difficult to handle because it is liquid.

Meanwhile, the biphenyl type epoxy compound has excellent soldering heat resistance and thermal impact resistance and gives no inconvenience in handling because it is crystalline. However, the compound has somewhat low reactivity.

Hence, the combined use of the above two compounds can give a resin composition wherein their drawbacks are supplemented by each other.

The biphenyl type epoxy resin represented by the formula [IV], which is used in the second preferable embodiment of the present invention, has a low viscosity of few centipoises at a molding temperature (165-185° C) and accordingly can significantly reduce the viscosity of the resulting resin composition. The biphenyl type epoxy resin further has a planar structure and has suf-ficiently dense molecular packing and therefore, can improve the strength and thermal impact resistance of the resulting resin composition. This resin, however, has poor reactivity and compatibility with other resins and possesses low viscosity and accordingly, has been inferior in moldability, particularly thin flash property and mold staining property.

This problem could be cleared by the combined use with the above-mentioned silicone-modified phenolic resin.

When the amount of the trifunctional epoxy resin of the formula [V] used is appropriately controlled, the resulting resin composition can have a maximum resistance to soldering stress. In the formula, $R_1$, $R_2$, $R_4$ to $R_7$, $R_{10}$ and $R_{11}$ are each preferably hydrogen atom, and $R_3$, $R_8$ and $R_9$ are each preferably methyl group.

The trifunctional epoxy resin, as compared with ordinary phenol novolac type epoxy resins, has a structure wherein motion of the main chain is restricted; accordingly, has high Tg and excellent heat resistance.

The total amount of the epoxy resins of the formula [IV] and the formula [V] is preferably 50-100% by weight based on the total epoxy resin amount. When it is less than 50% by weight, the resulting resin composition tends to be insufficient in both or either of soldering heat resistance and fluidity.

The weight ratio of the epoxy resins of the formula [IV] and the formula [V] is preferably [IV]/[V]=10/90 to 90/10. When it is less than 10/90, the resulting resin composition tends to have reduced fluidity and increased viscosity. When it is more than 90/10, the composition tends to have reduced resistance to soldering heat.

The silicone-modified phenolic resin curing agent used as the component (B) in the present invention can increase both soldering heat resistance and thermal impact resistance, and is a very important component. The phenolic resin as the one raw material for the silicone-modified phenolic resin includes, for example, phenol novolac resins, cresol novolac resins and resins obtained by modifying them, etc. These resins can be used alone or in admixture of two or more.

Of these phenolic resins, preferable are those which have a hydroxyl group equivalent of 80-150 and a softening point of 60-120° C. and which contain ionic impurities (e.g., $Na^+$, $Cl^-$) in an amount as small as possible.

The organopolysiloxane as the other raw material for the silicone-modified phenolic resin of the present invention has functional groups capable of reacting with the above phenolic resin. The functional groups include carboxyl group, cyclohexyl type epoxy group, glycidyl type epoxy group and active hydrogen.

The organopolysiloxane is represented by the following formula [I] or [II]:

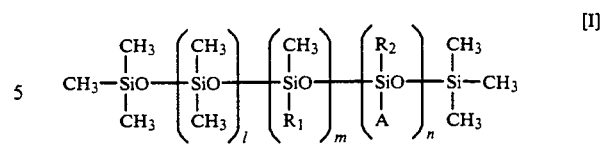

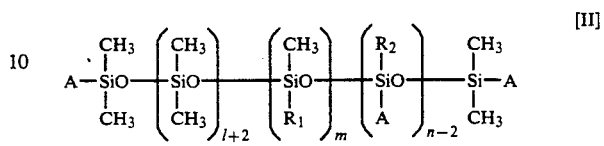

wherein

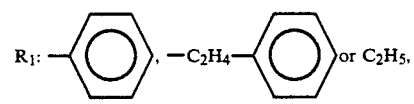

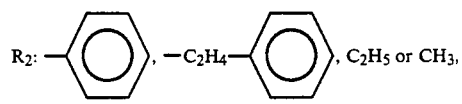

A: —R—COOH,

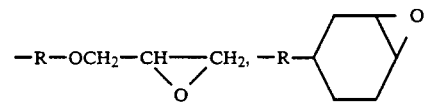

or H,

R: a lower alkylene group, $10 \leq N = l+m+n+2 \leq 200$, $0 \leq m/N \leq 0.1$, and $5 \leq N/n \leq 50$.

When N (l+m+n+2) is less than 10, the resulting resin composition has increased elastic modulus and decreased strength, and it is difficult to synthesize a silicone-modified phenolic resin curing agent because an organopolysiloxane having in the molecule no group reactive with the phenolic resin (i.e., having no group A in the formula [I] or [II]) is formed as a by-product at a higher probability.

When N is larger than 200, the organopoly-siloxane has reduced miscibility with the phenolic resin, which makes the reaction with the phenolic resin insufficient, invites bleeding of the silicone oil from the phenolic resin and resultantly reduces the moldability of the resulting composition greatly.

In the organopolysiloxane of the formula [I] or [II], m/N is preferably 0-0.1. When m/N is larger than 0.1, the thermal motion of siloxane chain is suppressed and the Tg of siloxane component is shifted to a higher temperature side; as a result, a lower stress effect is obtained only in a high temperature range and the resulting resin composition has reduced thermal impact resistance.

Moreover, when m/N is larger than 0.1, the synthesis of organopolysiloxane costs high.

The ratio m/N can take any value as long as it is not larger than 0.1, but is preferably about 0.05. It is because there is no Tg shift of the siloxane to a higher temperature side, and furthermore because the presence of side chain functional groups increases the compatibility with the phenolic resin and the synthesis of silicone-modified phenolic resin is easy.

Further, $5 \leq N/n \leq 50$ is preferable.

When N/n is larger than 50, the reactivity between the organopolysiloxane and the phenolic resin is poor; therefore, there is bleeding of unreacted organopolysiloxane and the resulting resin composition has reduced moldability. When N/n is smaller than 5, gelling occurs during the synthesis reaction and it is impossible to obtain a satisfactory silicone-modified phenolic resin.

The amount of the silicone component used for producing a silicone-modified phenolic resin is preferably 10–50 parts by weight per 100 parts by weight of the raw material phenolic resin.

When the amount of the silicone component is less than 10 parts by weight, the resulting silicone-modified phenolic resin is insufficient in thermal impact resistance. When the amount is more than 50 parts by weight, the reaction degree of the silicone component is reduced, there occurs bleeding of unreacted organopolysiloxane, and the resulting resin composition has reduced moldability.

As the organopolysiloxane, there is preferred an organopolysiloxane having an epoxy group-containing organic group. Such an organopolysiloxane having an epoxy group-containing organic group can be obtained by subjecting an organohydrogen polysiloxane and an unsaturated double bond group-containing epoxy (e.g., allyl glycidyl ether) to an addition reaction in the presence of chloroplatinic acid as a catalyst in an organic solvent.

The silicone-modified phenolic resin can be obtained, for example, by subjecting an organopolysiloxane and a phenolic resin to a ring-opening addition reaction in an organic solvent in the presence of at least one catalyst selected from imidazoles, organic phosphines and tertiary amines.

In the present invention, the silicone-modified phenolic resin curing agent can be used alone, but may be used in admixture with conventional phenolic resin curing agent(s). When the silicone-modified phenolic resin curing agent is used as a mixed system, it is necessary that the system comprises at least 30% by weight, based on the total system amount, of the silicone-modified phenolic resin curing agent. When the content of the silicone-modified phenolic resin curing agent is less than 30% by weight, the resulting resin composition has reduced thermal impact resistance. It is preferable that the silicone-modified phenolic resin curing agent be used in an amount of at least 50% by weight. In this case, any epoxy resin can be used as the component (A) without impairing the object and effect of the present invention.

The compounding ratio of the total epoxy component and the total phenolic resin component is preferably 70/100 to 100/70 in terms of the ratio of epoxy group/phenolic hydroxyl group. When the ratio is less than 70/100 or more than 100/70, there occurs reduction in Tg, reduction in hardness when hot, reduction in moisture resistance, etc., and the resulting resin composition is insufficient for use in semiconductor sealing.

When in an ordinary epoxy resin-phenolic resin system there is incorporated a naphthalene type epoxy compound or a biphenyl type epoxy compound or a mixture thereof, the resulting composition has reduced thin flash property. However, when in an epoxy resin/silicone-modified phenolic resin system there is incorporated a naphthalene type epoxy compound or a biphenyl type epoxy compound or a mixture thereof as in the present invention, the low-molecular epoxy compound reacts also with the phenolic resin having a high polymerization degree owing to the silicone modification; consequently, bleeding is unlikely to occur and there arises no reduction in thin flash property.

The inorganic filler used as the component (C) in the present invention includes crystalline silica, fused silica, alumina, calcium carbonate, talc, mica, glass fiber, etc. These fillers can be used alone or in admixture of two or more. Of them, crystalline silica or fused silica is particularly preferable.

In the embodiment of the present invention wherein the naphthalene type epoxy compound or the biphenyl type epoxy compound or the mixture thereof is used, the amount of the inorganic filler used is preferably 70–90% by weight based on the total resin composition amount. When the amount is less than 70% by weight, the resulting resin composition tends to have increased thermal expansion coefficient, no sufficiently low stress and accordingly reduced thermal impact resistance; tends to have higher water absorbability and accordingly reduced resistance to soldering heat; and tends to have too low a viscosity and accordingly thin flash and decreased moldability.

When the amount of the inorganic filler used is more than 90% by weight, the resulting resin composition has too high a viscosity, making the molding difficult.

The curing accelerator used as the component (D) in the present invention can be any one as long as it can accelerate the reaction between epoxy group and phenolic hydroxyl group. There can be widely used curing accelerators which are generally used in sealing materials. For example, the following compounds can be used alone or in admixture of two or more; tertiary amines such as BDMA and the like, imidazoles, 1,8-diazabicyclo[5,4,0]undecene-7, and organic phosphorus compounds such as triphenylphosphine and the like.

Into the epoxy resin composition of the present invention there can further be incorporated, as necessary, release agents (e.g., wax), flame retardants (e.g., hexabromobenzene, decabromobiphenyl ether, and antimony trioxide), coloring agents (e.g., carbon black, and red iron oxide), silane coupling agents, thermoplastic resins, etc.

The epoxy resin composition for semiconductor sealing according to the present invention can be easily produced by a general process. That is, raw materials of given proportions are thoroughly mixed by a mixer or the like; the mixture is melt-kneaded by rolls, a kneader or the like; the kneaded product is cooled and solidified; and the solid is ground to an appropriate size.

The present invention can provide an epoxy resin composition having high heat resistance, high thermal impact resistance and good moldability, which has been unobtainable with the prior art. This epoxy resin composition is excellent in cracking resistance and thermal impact resistance when subjected to heat stress by rapid temperature change at a soldering step. Accordingly, the epoxy resin composition of the present invention can be suitably used for sealing, coating, insulation, etc. of electronic and electric parts, particularly high integration large thin chip ICs mounted on surface mounting packages and requiring a high degree of reliability.

The present invention is described in more detail referring to Synthesis Examples, Examples and Comparative Examples.

SYNTHESIS EXAMPLE I

As shown in Table I-1, 20 parts by weight of an organopolysiloxane (one of *I-1 to *I-8 shown later) was reacted with 100 parts by weight of a phenol novolac resin in 200 parts by weight of a butanol solvent in the presence of a catalyst to obtain silicone-modified phenolic resins I(a) to I(h).

EXAMPLE I-1

| | |
|---|---|
| Cresol novolac type epoxy resin (epoxy equivalent = 200, softening point = 65° C.) | 90 parts by weight |
| Brominated phenol novolac type epoxy resin (epoxy equivalent = 272, softening point = 75° C., bromine content = 32%) | 10 parts by weight |
| Silicone-modified phenol novolac resin curing agent I(a) | 60 parts by weight |
| Fused silica | 450 parts by weight |
| Antimony trioxide | 25 parts by weight |
| Silane coupling agent | 2 parts by weight |
| Triphenylphosphine | 2 parts by weight |
| Carbon black | 3 parts by weight |
| Carnauba wax | 3 parts by weight |

The above materials were mixed thoroughly at room temperature. The mixture was kneaded by a twin roll at 95-100° C. The kneaded product was cooled, crushed and made into tablets to obtain an epoxy resin composition for semiconductor sealing.

This material was made into a molding using a transfer molding machine (mold temperature = 175° C., curing time = 2 minutes), whereby the material was examined for mold staining and resin flash. The molding was after-cured at 175° C. for 8 hours and examined for markability, thermal impact resistance, soldering moisture resistance and soldering heat resistance. The results are shown in Table I-2.

EXAMPLES I-2 and I-3

Components were compounded in accordance with the recipes shown in Table I-2 and treated in the same manner as in Example I-1 to obtain epoxy resin compositions for semiconductor sealing. These resin compositions were examined for properties, and the results are shown in Table I-2.

COMPARATIVE EXAMPLES I-1 to I-6

Components were compounded in accordance with the recipes shown in Table I-2 and treated in the same manner as in Example I-1 to obtain epoxy resin compositions for semiconductor sealing. These resin compositions were examined for properties, and the results are shown in Table I-2.

Organopolysiloxane *I-1

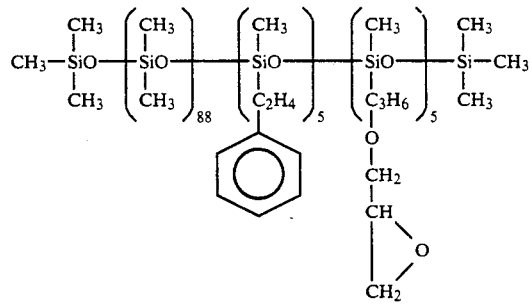

Organopolsiloxane *I-2

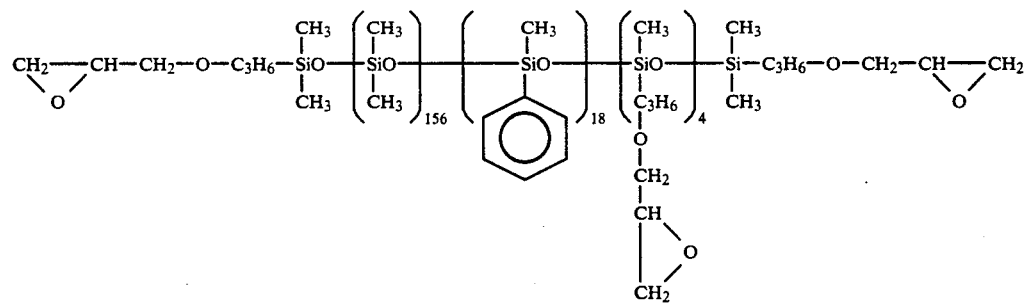

Organopolysiloxane *I-3

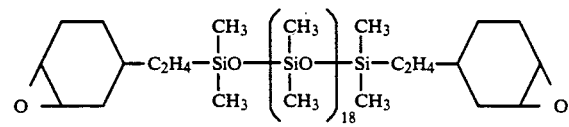

Organopolysiloxane *I-4

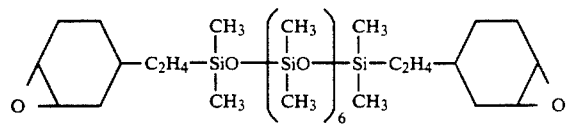

Organopolysiloxane *I-5

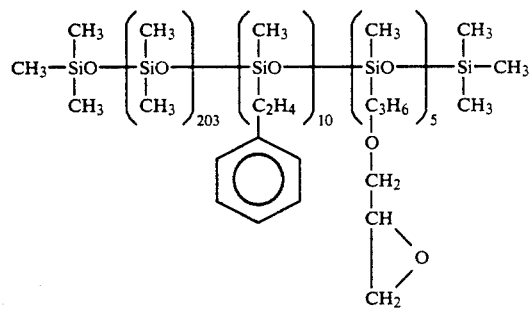

Organopolysiloxane *I-6

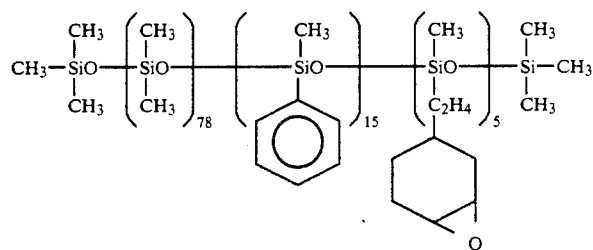

Organopolysilocane *I-7

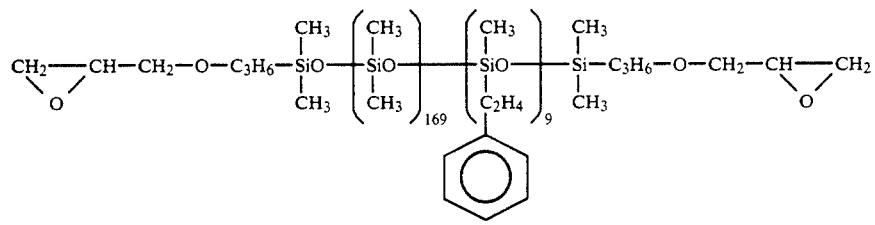

Organopolysiloxane *I-8

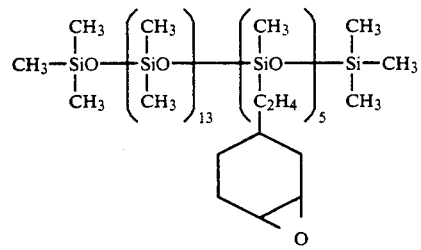

*I-9 Epoxy resin ESX-221 produced by Sumitomo Chemical Co., Ltd. (epoxy equivalent = 210 g/eq; softening point = 84° C.).

*I-10 Epoxy resin ESX-221 produced by Sumitomo Chemical Co., Ltd. (epoxy equivalent = 210 g/eq; softening point = 85° C.).

TABLE I-1

| | Silicone-modified phenolic resin I(a) | Silicone-modified phenolic resin I(b) | Silicone-modified phenolic resin I(c) | Silicone-modified phenolic resin I(d) | Silicone-modified phenolic resin I(e) | Silicone-modified phenolic resin I(f) | Silicone-modified phenolic resin I(g) | Silicone-modified phenolic resin I(h) |
|---|---|---|---|---|---|---|---|---|
| Raw materials | | | | | | | | |

TABLE I-1-continued

|  | Silicone-modified phenolic resin I(a) | Silicone-modified phenolic resin I(b) | Silicone-modified phenolic resin I(c) | Silicone-modified phenolic resin I(d) | Silicone-modified phenolic resin I(e) | Silicone-modified phenolic resin I(f) | Silicone-modified phenolic resin I(g) | Silicone-modified phenolic resin I(h) |
|---|---|---|---|---|---|---|---|---|
| Phenolic resin Phenol novolac resin (OH equivalent:105, softening point: 95° C.) (parts by weight) | 100 | 100 | 100 | 100 | 100 | 100 | 100 | 100 |
| Silicone |  |  |  |  |  |  |  |  |
| Organopolysiloxane *I-1 (parts by weight) | 20 |  |  |  |  |  |  |  |
| Organopolysiloxane *I-2 (parts by weight) |  | 20 |  |  |  |  |  |  |
| Organopolysiloxane *I-3 (parts by weight) |  |  | 20 |  |  |  |  |  |
| Organopolysiloxane *I-4 (parts by weight) |  |  |  |  |  |  |  |  |
| Organopolysiloxane *I-5 (parts by weight) |  |  |  |  | 20 |  |  |  |
| Organopolysiloxane *I-6 (parts by weight) |  |  |  |  |  | 20 |  |  |
| Organopolysiloxane *I-7 (parts by weight) |  |  |  |  |  |  | 20 |  |
| Organopolysiloxane *I-8 (parts by weight) |  |  |  |  |  |  |  | 20 |
| N (polymerization degree of siloxane) | 100 | 180 | 20 | 8 | 220 | 100 | 180 | 20 |
| m/N (molar fraction of phenol group or phenylethyl group) | 0.05 | 0.10 | 0 | 0 | 0.05 | 0.15 | 0.05 | 0 |
| N/n (siloxane polymerization degree/number of functional groups) | 20 | 30 | 10 | 4 | 44 | 20 | 90 | 4 |
| Reaction conditions |  |  |  |  |  |  |  |  |
| Kind of solvent | Butanol | Butanol | Butanol | Butanol | Butanol | Butanol | Butanol | Butanol |
| Amount of solvent (parts by weight) | 200 | 200 | 200 | 200 | 200 | 200 | 200 | 200 |
| Kind of catalyst | DBU | Tri-phenyl-phos-phine | DBU | Tri-phenyl-phos-phine | Tri-phenyl-phos-phine | DBU | DBU | Tri-phenyl-phos-phine |
| Amount of catalyst (parts by weight) | 2 | 2 | 2 | 2 | 2 | 2 | 2 | 2 |
| Reaction temperature (°C.) | 150 | 150 | 150 | 150 | 150 | 150 | 150 | 150 |
| Reaction time (hr) | 10 | 20 | 10 | 20 | 20 | 10 | 10 | 20 |
| Properties |  |  |  |  |  |  |  |  |
| Hydroxyl group equivalent (g/eq) | 134 | 128 | 128 | 131 | 131 | 128 | 132 | 132 |
| Softening point (°C.) | 107 | 109 | 105 | 105 | 111 | 112 | 106 | 108 |

TABLE I-2

|  | Example | | | Comparative Example | | | | | |
|---|---|---|---|---|---|---|---|---|---|
|  | I-1 | I-2 | I-3 | I-1 | I-2 | I-3 | I-4 | I-5 | I-6 |
| Epoxy Resin |  |  |  |  |  |  |  |  |  |
| Cresol novolac type epoxy resin (epoxy equivalent: 200, softening point: 65° C.) (parts by weight) | 90 |  |  |  |  |  |  | 90 |  |
| Epoxy resin *I-9 (parts by weight) |  | 90 |  | 90 |  |  | 90 |  | 90 |
| Epoxy resin *I-10 (parts by weight) |  |  | 90 | 90 |  | 90 |  |  |  |
| Brominated phenol novolac type epoxy resin (epoxy equivalent: 272, softening point: 75° C., bromine content: 32%) (parts by weight) | 10 | 10 | 10 | 10 | 10 | 10 | 10 | 10 | 10 |
| Phenolic resin curing agent |  |  |  |  |  |  |  |  |  |
| Silicone-modified phenolic resin I(a) (parts by weight) | 60 |  |  |  |  |  |  |  |  |
| Silicone-modified phenolic resin I(b) (parts by weight) |  | 30 |  |  |  |  |  |  |  |
| Silicone-modified phenolic resin I(c) (parts by weight) |  |  | 50 | 10 |  |  |  |  |  |
| Silicone-modified phenolic resin I(d) (parts by weight) |  |  |  |  | 60 |  |  |  |  |
| Silicone-modified phenolic resin I(e) (parts by weight) |  |  |  |  |  | 50 |  |  |  |
| Silicone-modified phenolic resin I(f) (parts by weight) |  |  |  |  |  |  | 40 |  |  |
| Silicone-modified phenolic resin I(g) (parts by weight) |  |  |  |  |  |  |  | 60 |  |
| Silicone-modified phenolic resin I(h) (parts by weight) |  |  |  |  |  |  |  |  | 30 |
| Phenol novolac resin (OH equivalent: 105, softening point: 95° C.) (parts by weight) | 25 | 10 | 40 |  | 10 | 15 |  |  | 25 |
| Inorganic filler and others |  |  |  |  |  |  |  |  |  |
| Fused silica (parts by weight) | 450 |  |  |  | 450 |  |  |  |  |
| Antimony trioxide | 25 |  |  |  | 25 |  |  |  |  |

TABLE I-2-continued

| | | Example | | | | | | Comparative Example | | | | | | | | | | | |
|---|---|---|---|---|---|---|---|---|---|---|---|---|---|---|---|---|---|---|
| | | I-1 | | I-2 | | I-3 | | I-1 | | I-2 | | I-3 | | I-4 | | I-5 | | I-6 |
| (parts by weight) Silane coupling agent | | | | 2 | | | | | | | | | | 2 | | | | |
| (parts by weight) Triphenylphosphine | | | | 2 | | | | | | | | | | 2 | | | | |
| (parts by weight) Carnauba wax | | | | 3 | | | | | | | | | | 3 | | | | |
| (parts by weight) Carbon black (parts by weight) | | | | 3 | | | | | | | | | | 3 | | | | |
| Properties | | | | | | | | | | | | | | | | | | |
| Moldability | Spiral flow (cm) *I-11 | ○ | 95 | ○ | 80 | ○ | 86 | ○ | 87 | ○ | 99 | X | 48 | ○ | 98 | X | 42 | X | 23 |
| | Length of resin flash (mm) *I-12 | ○ | <0.5 | ○ | <0.5 | ○ | <0.5 | ○ | <0.5 | X | >5 | Δ | 1.9 | ○ | <0.5 | X | 4.3 | ○ | <0.5 |
| | Mold staining (number of shots) *I-13 | ○ | 2800 | ○ | 2300 | ○ | 2200 | ○ | 2400 | Δ | 800 | X | 70 | ○ | 2600 | X | 90 | ○ | 2500 |
| | Markability (number of marks removed) *I-14 | ○ | 0 | ○ | 1 | ○ | 0 | ○ | 1 | X | 36 | X | 50 | ○ | 0 | X | 43 | ○ | 0 |
| Reliability | Thermal impact resistance (number of cracked moldings) *I-15 | ○ | 0 | ○ | 0 | ○ | 1 | X | 17 | Δ | 9 | Δ | 10 | X | 18 | Δ | 8 | X | 15 |
| | Average life in soldering moisture resistance test (hr) *I-16 | ○ | >300 | ○ | >300 | ○ | >300 | X | 100 | Δ | 220 | Δ | 200 | X | 80 | Δ | 200 | X | 60 |
| | Soldering heat resistance (number of cracked moldings) *I-17 | ○ | 2 | ○ | 1 | ○ | 0 | Δ | 11 | Δ | 9 | Δ | 10 | X | 14 | Δ | 7 | X | 18 |
| Overall evaluation | | ○ | | ○ | | ○ | | X | | X | | X | | X | | X | | X |

Evaluation methods
*I-11 Spiral flow
This is a length of a molding obtained when 20 g of a sample was molded at a molding temperature of 175° C. at a molding pressure of 7.0 Mpa for 2 minutes, using a mold for spiral flow measurement.
*I-12 Length of resin flash
There was measured the length of resin flash of the bent portion of the molding obtained.
*I-13 Mold staining
Mold staining was examined by the number of molding shots when the mold first showed clouding.
*I-14 Markability
50 marks were given to 50 moldings of 10th shot; then, a cellophane tape was applied to each of the moldings; the tape was removed by peeling; and the number of marks removed was examined. In Table I-2, there is shown the number of peeled marks among the total 50 marks applied.
*I-15 Thermal impact resistance
20 same moldings (chip size = 36 mm², package thickness = 2.0 mm, after-curing = 175° C. × 8 hours) were subjected to a temperature cycle test (150° C. to −196° C.) consisting of 500 cycles, to examine the thermal impact resistance by the number of moldings which gave crack(s). In Table I-2, there is shown the number of moldings which gave crack(s).
*I-16 Average life in soldering moisture resistance test
A sealed test sample was treated in steam of 85° C. and 85% R.H. for 72 hours; the treated test sample was immersed in a solder bath of 240° C. for 10 seconds; the resulting test sample was subjected to a pressure cooker test (125° C., 100% R.H.) to examine the poor opening of circuit.
*I-17 Soldering heat resistance
20 same moldings (chip size = 36 mm², package thickness = 2.05 mm) were treated in steam of 85° C. and 85% R.H. for 72 hours; the treated moldings were immersed in a solder bath of 240° C. for 10 seconds to examine the soldering heat resistance by the number of moldings which gave crack(s). In Table I-2, there is shown the number of moldings which gave crack(s).

SYNTHESIS EXAMPLE II

As shown in Table II-1, an organopolysiloxane (one or more of *II-1 to *II-8 shown later) was reacted with a phenol novolac resin (softening point = 105° C. OH equivalent = 105) in a solvent in the presence of a of a catalyst to obtain silicon-modified phenolic resins II(a) to II(h).

EXAMPLE II-1

| | |
|---|---|
| 1,6-Dihydroxynaphthalene diglycidyl ether | 90 parts by weight |
| Brominated bisphenol A type epoxy resin (epoxy equivalent = 370, softening point = 65° C., bromine content = 37%) | 10 parts by weight |
| Silicone-modified phenol novolac resin II(a) | 70 parts by weight |
| Crushed fused silica | 800 parts by weight |
| Antimony trioxide | 10 parts by weight |
| Silane coupling agent | 2 parts by weight |
| Triphenylphosphine | 2 parts by weight |
| Carbon black | 3 parts by weight |
| Carnauba wax | 3 parts by weight |

The above materials were mixed thoroughly at room temperature. The mixture was kneaded by a win roll at 95–100° C. The kneaded product was cooled, crushed and made into tablets to obtain an epoxy resin composition for semiconductor sealing.

This material was made into a molding using a transfer molding machine (mold temperature = 175° C., curing time = 2 minutes). The molding was after-cured at 175° C. for 8 hours and examined for properties. The results are shown in Table II-2.

EXAMPLES II-2 to II-4

The epoxy resin compositions for semiconductor sealing whose compounding recipes are shown in Table II-2 were obtained in the same manner as in Example II-1.

These resin compositions were examined for properties, and the results are shown in Table II-2.

COMPARATIVE EXAMPLES II-1 to II-6

The epoxy resin compositions for semiconductor seal whose compounding recipes are shown in Table II-2 were obtained in the same manner as in Example II-1.

These resin compositions were examined for properties, and the results are shown in Table II-2.

Organopolysiloxane *II-1

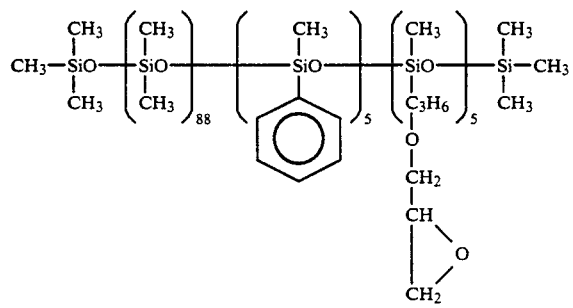

Organopolysiloxane *II-2

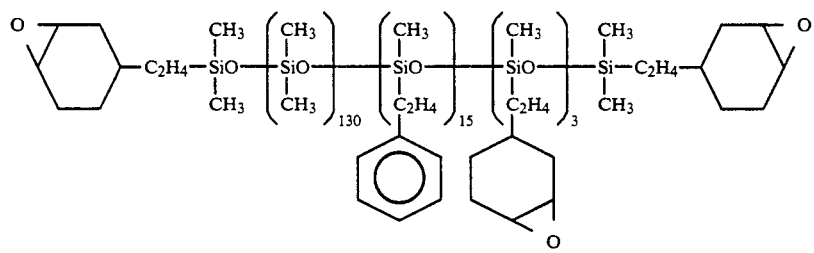

Organopolysiloxane *II-3

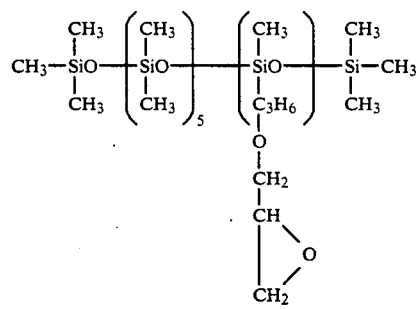

Organopolysiloxane *II-4

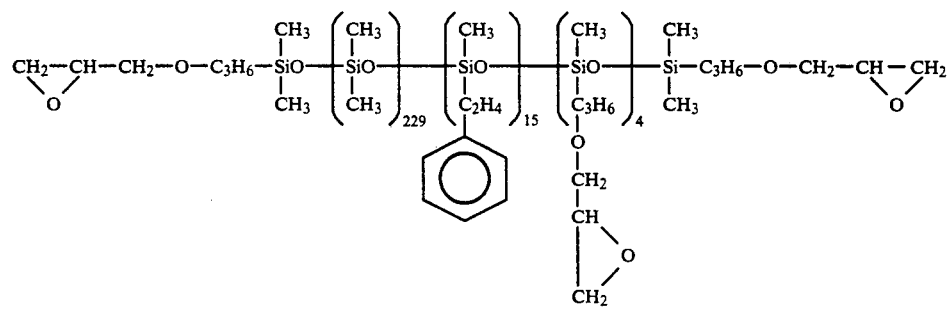

Organopolysiloxane *II-5

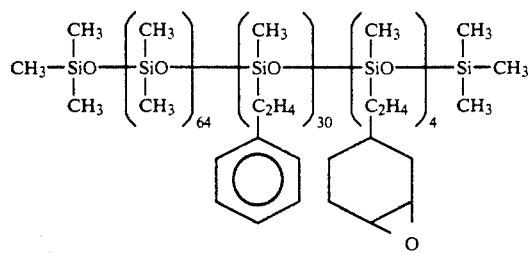
Organopolysiloxane *II-6
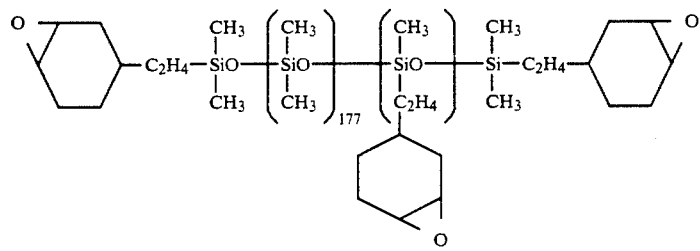
Organopolysiloxane *II-7
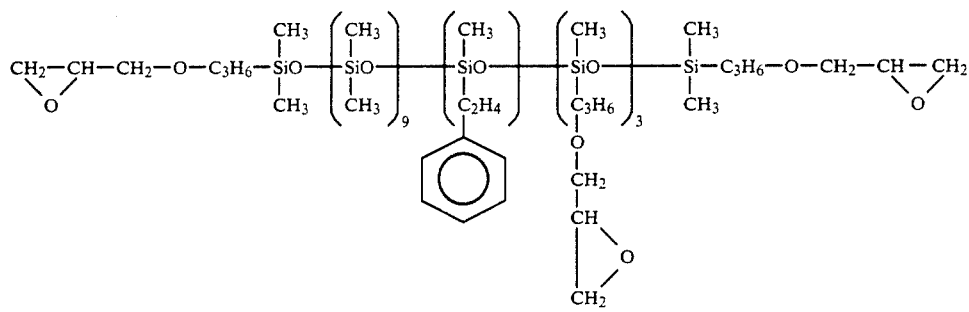
*II-8 Naphthalene type epoxy compound represented by the following formula [III]
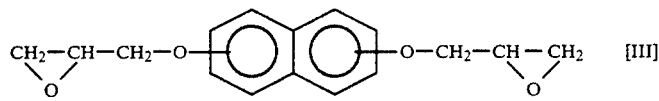
*II-9 Epoxy resin represented by the following formula
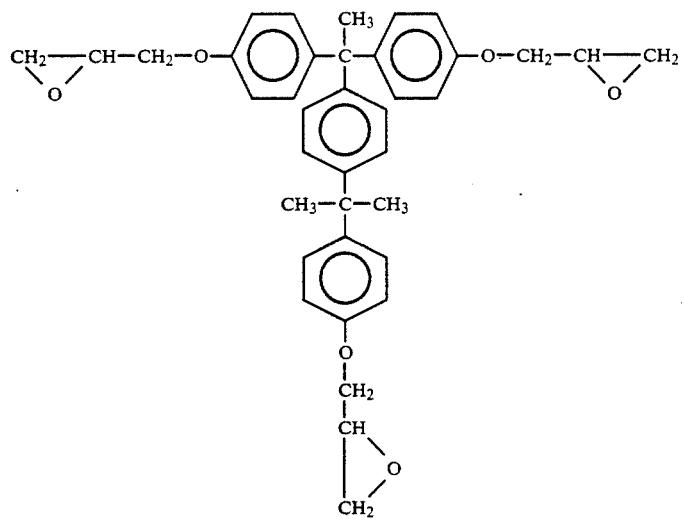
*II-10 Phenolic resin represented by the following formula

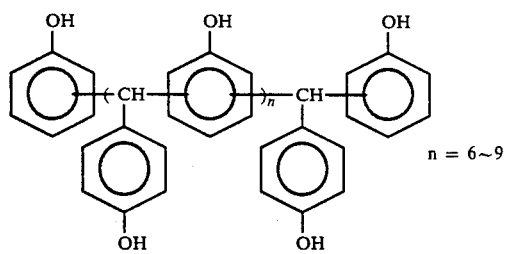

n = 6~9

TABLE II-1

| | | Silicone-modified phenolic resin II (a) | Silicone-modified phenolic resin II (b) | Silicone-modified phenolic resin II (c) | Silicone-modified phenolic resin II (d) | Silicone-modified phenolic resin II (e) | Silicone-modified phenolic resin II (f) | Silicone-modified phenolic resin II (g) | Silicone-modified phenolic resin II (h) |
|---|---|---|---|---|---|---|---|---|---|
| Raw materials | | | | | | | | | |
| Phenolic resin | Phenol novolac resin (OH equivalent: 105, softening point: 105° C.) (parts by weight) | 100 | 100 | 100 | 100 | 100 | 100 | 100 | 100 |
| Silicone | | | | | | | | | |
| Organopolysiloxane *II-1 (parts by weight) | | 30 | | 10 | | | | | |
| Organopolysiloxane *II-2 (parts by weight) | | | 30 | 20 | | | | | |
| Organopolysiloxane *II-3 (parts by weight) | | | | | 30 | | | | |
| Organopolysiloxane *II-4 (parts by weight) | | | | | | 30 | | | |
| Organopolysiloxane *II-5 (parts by weight) | | | | | | | 30 | | |
| Organopolysiloxane *II-6 (parts by weight) | | | | | | | | 30 | |
| Organopolysiloxane *II-7 (parts by weight) | | | | | | | | | 30 |
| N (polymerization degree of siloxane) | | 100 | 150 | — | 8 | 250 | 100 | 180 | 15 |
| m/N (molar fraction of phenyl group or phenylethyl group) | | 0.05 | 0.10 | — | 0 | 0.06 | 0.30 | 0 | 0.07 |
| N/n (siloxane polymerization degree/number of functional groups) | | 20 | 30 | — | 8 | 41.6 | 25 | 60 | 3 |
| Reaction conditions | | | | | | | | | |
| Kind of solvent | | Toluene | Toluene | Toluene | Toluene | Toluene | Toluene | Toluene | Toluene |
| Amount of solvent (parts by weight) | | 200 | 200 | 200 | 200 | 250 | 200 | 200 | 200 |
| Kind of catalyst | | Triphenyl-phosphine | Triphenyl-phosphine | Triphenyl-phosphine | Triphenyl-phosphine | Triphenyl-phosphine | Triphenyl-phosphine | Triphenyl-phosphine | Triphenyl-phosphine |
| Amount of catalyst (parts by weight) | | 2 | 2 | 3 | 2 | 2 | 3 | 3 | 2 |
| Reaction temperature (°C.) | | 100 | 100 | 100 | 100 | 100 | 100 | 100 | 100 |
| Reaction time (hr) | | 5 | 5 | 7 | 5 | 7 | 5 | 5 | 5 |
| Properties | | | | | | | | | |
| Hydroxyl group equivalent (g/eq) | | 137 | 138 | 140 | 135 | 136 | 140 | 142 | 137 |
| Softening point (°C.) | | 105 | 107 | 110 | 106 | 106 | 108 | | |

TABLE II-1-continued

|  | | |
|---|---|---|
| Softening point (°C.) | 110 | 105 |

TABLE II-2

|  | Example | | | | Comparative Example | |
|---|---|---|---|---|---|---|
|  | II-1 | II-2 | II-3 | II-4 | II-1 | II-2 |
| Epoxy resin | | | | | | |
| Naphthalene type epoxy resin *II-8 (parts by weight) | 90 | 90 | 90 | 50 | 90 | 90 |
| Epoxy resin *II-9 (parts by weight) | | | | 40 | | |
| Brominated bisphenol A type epoxy resin (epoxy equivalent: 370, softening point: 65° C.) (parts by weight) | 10 | 10 | 10 | 10 | 10 | 10 |
| Phenolic resin curing agent | | | | | | |
| Silicone-modified phenol novolac resin II (a) (parts by weight) | 70 | | | | | |
| Silicone-modified phenol novolac resin II (b) (parts by weight) | | 70 | | 30 | | |
| Silicone-modified phenol novolac resin II (c) (parts by weight) | | | 70 | 10 | | |
| Silicone-modified phenol novolac resin II (d) (parts by weight) | | | | | 70 | |
| Silicone-modified phenol novolac resin II (e) (parts by weight) | | | | | | 70 |
| Silicone-modified phenol novolac resin II (f) (parts by weight) | | | | | | |
| Silicone-modified phenol novolac resin II (g) (parts by weight) | | | | | | |
| Silicone-modified phenol novolac resin II (h) (parts by weight) | | | | | | |
| Phenol novolac resin (OH equivalent: 105, softening point: 105° C.) (parts by weight) | | | | | | |
| Phenolic resin *II-10 (parts by weight) | | | | 30 | | |
| Filler | | | | | | |
| Crushed filler (parts by weight) | 800 | 800 | 800 | | 800 | 800 |
| Spherical filler (parts by weight) | | | | 1000 | | |
| Spiral flow (cm) *II-11 | 95 | 96 | 101 | 92 | 45 | 85 |
| Length of resin flash (mm) *II-12 | 0.5 | 0.4 | 0.6 | 0.4 | 0.6 | 5.3 |
| Flexural strength (kg/mm$^2$)/elastic modulus (kg/mm$^2$) *II-13 | 1450/16.0 | 1450/16.2 | 1430/15.9 | 1450/16.0 | 1450/16.0 | 1510/15.0 |
| Flexural expansion coefficient ($\times 10^{-5}$/°C.) *II-14 | 1.40 | 1.41 | 1.38 | 1.35 | 1.50 | 1.40 |
| Tg (°C.) *II-15 | 155 | 160 | 152 | 155 | 145 | 149 |
| Thermal impact resistance (number of cracked moldings) *II-16 | 0 | 0 | 0 | 0 | 2 | 2 |
| Soldering heat resistance (number of cracked moldings) *II-17 | 0 | 0 | 1 | 0 | 3 | 2 |
| Overall evaluation | ○ | ○ | ○ | ○ | Δ | X |

|  | Comparative Example | | | |
|---|---|---|---|---|
|  | II-3 | II-4 | II-5 | II-6 |
| Epoxy resin | | | | |
| Naphthalene type epoxy resin *II-8 (parts by weight) | 90 | 90 | 90 | 80 |
| Epoxy resin *II-9 (parts by weight) | | | | 5 |
| Brominated bisphenol A type epoxy resin (epoxy equivalent: 370, softening point: 65° C.) (parts by weight) | 10 | 10 | 10 | 10 |
| Silicone-modified phenol novolac resin II (a) (parts by weight) | | | | 10 |
| Silicone-modified phenol novolac resin II (b) (parts by weight) | | | | |
| Silicone-modified phenol novolac resin II (c) (parts by weight) | | | | |
| Silicone-modified phenol novolac resin II (d) (parts by weight) | | | | |
| Silicone-modified phenol novolac resin II (e) (parts by weight) | | | | |
| Silicone-modified phenol novolac resin II (f) (parts by weight) | 70 | | | |
| Silicone-modified phenol novolac resin II (g) (parts by weight) | | 70 | | |
| Silicone-modified phenol novolac resin II (h) (parts by weight) | | | 70 | |
| Phenol novolac resin (OH equivalent: 105, softening point: 105° C.) (parts by weight) | | | | 50 |
| Phenolic resin *II-10 (parts by weight) | | | | |
| Crushed filler (parts by weight) | 800 | 800 | 800 | 800 |
| Spherical filler (parts by weight) | | | | |
| Spiral flow (cm) *II-11 | 91 | 89 | 62 | 85 |
| Length of resin flash (mm) *II-12 | 0.6 | 4.2 | 0.5 | >10 |
| Flexural strength (kg/mm$^2$)/elastic modulus (kg/mm$^2$) *II-13 | 1450/16.1 | 1520/15.3 | 1450/15.5 | 1700/16.5 |
| Flexural expansion coefficient ($\times 10^{-5}$/°C.) *II-14 | 1.41 | 1.42 | 1.40 | 1.50 |
| Tg (°C.) *II-15 | 155 | 152 | 159 | 158 |
| Thermal impact resistance (number of cracked moldings) *II-16 | 5 | 2 | 3 | 10 |
| Soldering heat resistance (number of cracked moldings) *II-17 | 0 | 1 | 2 | 2 |
| Overall evaluation | Δ | X | Δ | X |

Evaluation methods
*II-11 Spiral flow Measured by the same method as for *I-11.
*II-12 Length of resin flash Measured by the same method as for *I-12.
*II-13 Flexural strength and elastic modulus Measured at a span of 100 mm at a speed of 10 mm/min at room temperature, using a TENSILON flexural strength tester.
*II-14 Thermal expansion coefficient Measured at 25° C. for a sample of 15 × 3 × 4 mm, using a thermal expansion coefficient tester.
*II-15 Tg (glass transition temperature) Measured for a sample of 15 × 3 × 4 mm, using a thermal expansion coefficient tester.
*II-16 Thermal impact resistance Measured by the same method as for *I-15.
*II-17 Soldering heat resistance 20 Moldings (chip size = 36 mm$^2$, package thickness = 2.0 mm) were treated in steam of 85° C. and 85% R.H. for 72 hours, and the treated moldings were subjected to VPS (vapor phase soldering) treatment at 215° C. for 90 seconds to examine the soldering heat resistance by the number of moldings which gave crack(s).

SYNTHESIS EXAMPLE III

As shown in Table III-1, an organopolysiloxane (one or two of *II-1 to *III-7 shown later) was reacted with a phenol novolac resin (softening point=105° C., OH equivalent=105) in a solvent in the presence of a catalyst to obtain silicone-modified phenolic resins III(a) to III(h).

EXAMPLE III-1

| | |
|---|---|
| 3,5,3', 5'-Tetramethyl-4,4'-dihydroxybiphenyl diglycidyl ether | 90 parts by weight |
| Brominated bisphenol A type epoxy resin (epoxy equivalent = 370, softening point = 65° C., bromine content = 37%) | 10 parts by weight |
| Silicone-modified phenol novolac resin III(a) | 70 parts by weight |
| Crushed fused silica | 800 parts by weight |
| Antiomony trioxide | 10 parts by weight |
| Silane coupling agent | 2 parts by weight |
| Triphenylphosphine | 2 parts by weight |
| Carbon black | 3 parts by weight |
| Carnauba wax | 3 parts by weight |

The above materials were mixed thoroughly at room temperature. The mixture was kneaded by a twin roll at 95-100° C. The kneaded product was cooled, crushed and made into tablets to obtain an epoxy resin composition for semiconductor sealing.

This material was made into a molding using a transfer molding machine (mold temperature=175° C., curing time=2 minutes). The molding was after-cured at 175° C. for 8 hours and examined for properties. The results are shown in Table III-2.

EXAMPLE III-2

An epoxy resin composition for semiconductor sealing was obtained in the same manner as in Example III-1 except that the amount of 3,5,3',5'-tetramethyl-4,4'-dihydroxybiphenyl diglycidyl ether was changed from 90 parts by weight to 50 parts by weight and there was newly added 35 parts by weight of 4,4'-dihydroxybiphenyl diglycidyl ether.

The resin composition was examined for properties, and the results are shown in Table III-2.

EXAMPLES III-3 to III-4

Epoxy resin compositions for semiconductor sealing whose compounding recipes are shown in Table III-2 were obtained in the same manner as for Example III-1.

The resin compositions were examined for properties, and the results are shown in Table III-2.

COMPARATIVE EXAMPLES III-1 to III-6

Epoxy resin compositions for semiconductor sealing whose compounding recipes are shown in Table III-2 were obtained in the same manner as for Example III-1.

The resin compositions were examined for properties, and the results are shown in Table III-2.

Organopolysiloxane *III-1

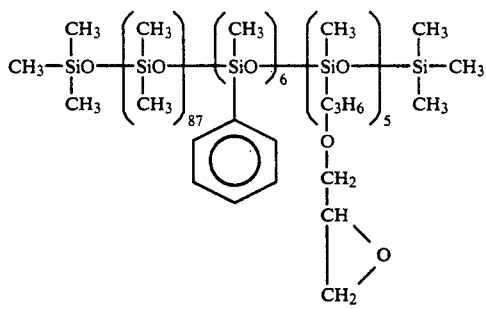

Organopolysiloxane *III-2

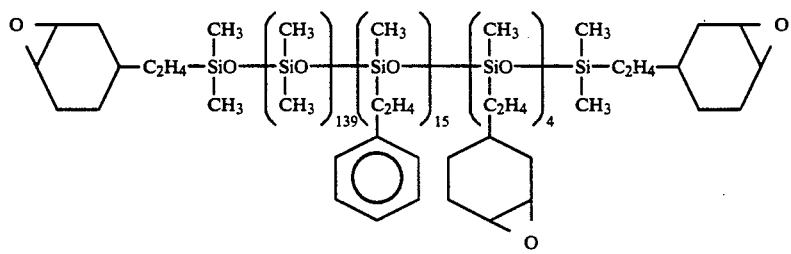

Organopolysiloxane *III-3

-continued
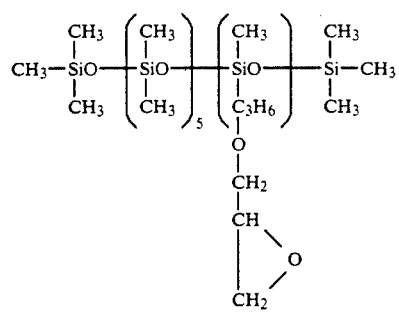
Organopolysiloxane *III-4
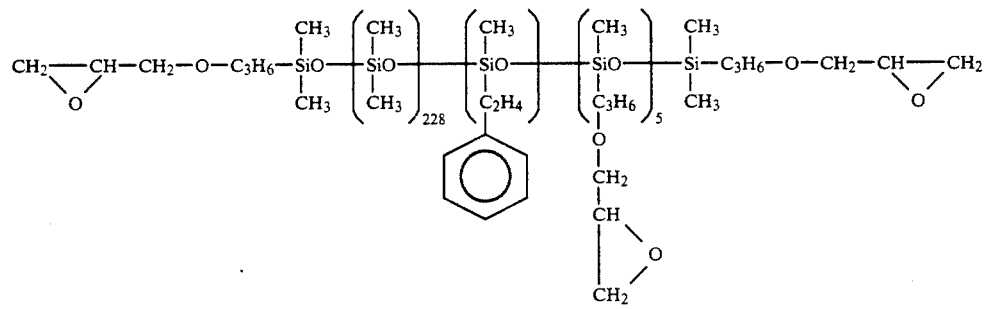
Organopolysiloxane *III-5
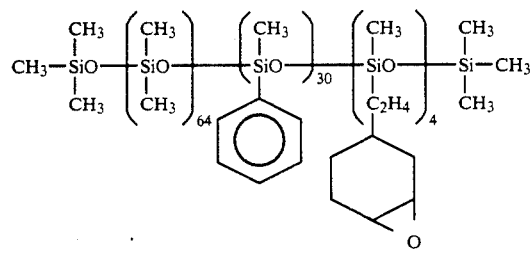
Organopolysiloxane *III-6
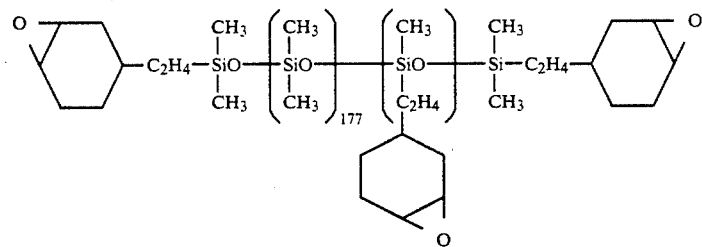
Organopolysiloxane *III-7
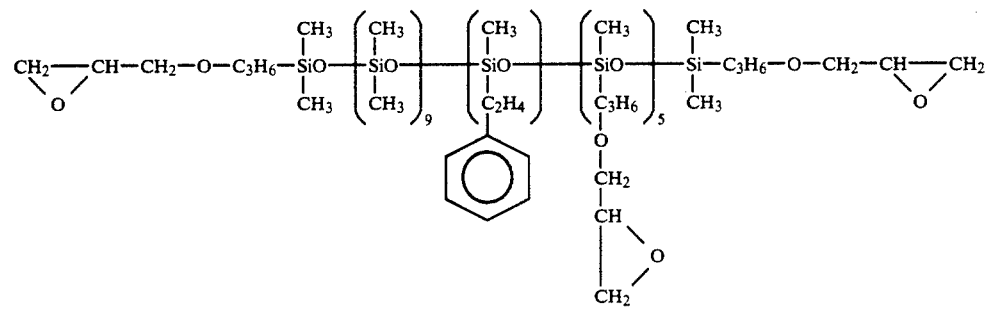
*III-8 Biphenyl type epoxy compound represented by the following formula (epoxy equivalent = 185)

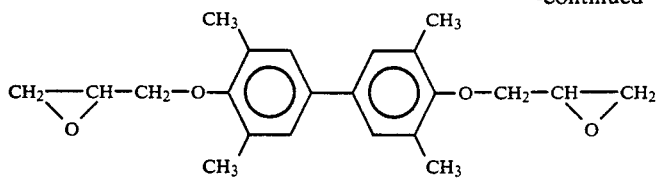

*III-9 Biphenyl type epoxy compound represented by the following formula

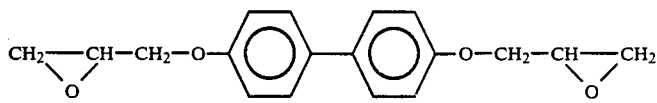

*III-10 Epoxy resin represented by the following formula

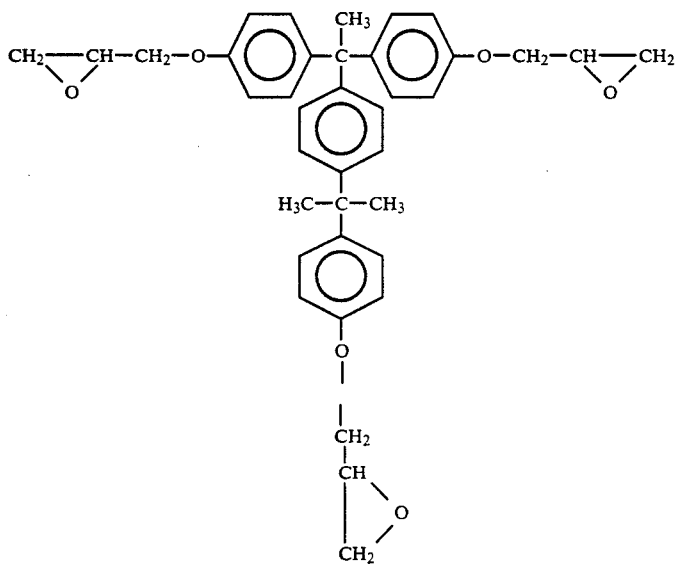

*III-11 Phenolic resin represented by the following formula

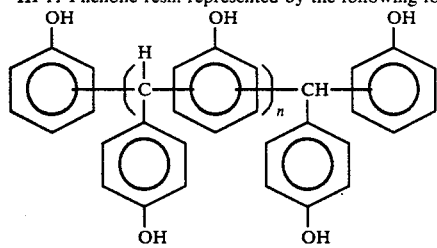

n = 0~9

TABLE III-1

|  |  |  | Silicone-modified phenolic resin III(a) | Silicone-modified phenolic resin III(b) | Silicone-modified phenolic resin III(c) | Silicone-modified phenolic resin III(d) | Silicone-modified phenolic resin III(e) | Silicone-modified phenolic resin III(f) | Silicone-modified phenolic resin III(g) | Silicone-modified phenolic resin III(h) |
|---|---|---|---|---|---|---|---|---|---|---|
| Raw materials |  |  |  |  |  |  |  |  |  |  |
| Phenolic resin | Phenol novolac resin (OH equivalent: 105, softening point: 105° C.) | (parts by weight) | 100 | 100 | 100 | 100 | 100 | 100 | 100 | 100 |
| Silicone |  |  |  |  |  |  |  |  |  |  |
| Organopolysiloxane *III-1 |  | (parts by weight) | 30 |  | 10 |  |  |  |  |  |
| Organopolysiloxane *III-2 |  | (parts by weight) |  | 30 | 20 |  |  |  |  |  |
| Organopolysiloxane *III-3 |  | (parts by weight) |  |  |  | 30 |  |  |  |  |
| Organopolysiloxane *III-4 |  | (parts by weight) |  |  |  |  | 30 |  |  |  |
| Organopolysiloxane *III-5 |  | (parts by weight) |  |  |  |  |  | 30 |  |  |
| Organopolysiloxane *III-6 |  | (parts by weight) |  |  |  |  |  |  | 30 |  |
| Organopolysiloxane *III-7 |  | (parts by weight) |  |  |  |  |  |  |  | 30 |

TABLE III-1-continued

|  | Silicone-modified phenolic resin III(a) | Silicone-modified phenolic resin III(b) | Silicone-modified phenolic resin III(c) | Silicone-modified phenolic resin III(d) | Silicone-modified phenolic resin III(e) | Silicone-modified phenolic resin III(f) | Silicone-modified phenolic resin III(g) | Silicone-modified phenolic resin III(h) |
|---|---|---|---|---|---|---|---|---|
| N (polymerization degree of siloxane) | 100 | 160 | — | 8 | 236 | 100 | 180 | 17 |
| m/N (molar fraction of phenyl group or phenylethyl group) | 0.06 | 0.094 | — | 0 | 0.004 | 0.30 | 0 | 0.06 |
| N/n (siloxane polymerization degree/number of functional groups) | 20 | 26.7 | — | 8 | 33.7 | 25 | 60 | 2.4 |
| Reaction conditions | | | | | | | | |
| Kind of solvent | Toluene | Toluene | Toluene | Toluene | Toluene | Toluene | Toluene | Toluene |
| Amount of solvent (parts by weight) | 200 | 200 | 200 | 230 | 250 | 200 | 200 | 200 |
| Kind of catalyst | Triphenyl phosphine | Triphenyl phosphine | Triphenyl phosphine | Triphenyl phosphine | Triphenyl phosphine | Triphenyl phosphine | Triphenyl phosphine | Triphenyl phosphine |
| Amount of catalyst (parts by weight) | 2 | 2 | 3 | 2 | 2 | 3 | 3 | 2 |
| Reaction temperature (°C.) | 100 | 100 | 100 | 100 | 100 | 100 | 100 | 100 |
| Reaction time (hr) | 5 | 5 | 7 | 5 | 7 | 5 | 5 | 5 |
| Properties | | | | | | | | |
| Hydroxyl group equivalent (g/eq) | 137 | 138 | 140 | 135 | 136 | 140 | 136 | 138 |
| Softening point (°C.) | 105 | 107 | 110 | 106 | 106 | 108 | 111 | 106 |

TABLE III-2

|  |  | Example | | | | Comparative Example | | | | | |
|---|---|---|---|---|---|---|---|---|---|---|---|
|  |  | III-1 | III-2 | III-3 | III-4 | III-1 | III-2 | III-3 | III-4 | III-5 | III-6 |
| Epoxy resin | | | | | | | | | | | |
| 3,5,3',5'-Tetramethyl-4,4'-dihydroxybiphenyl diglycidyl ether *III-8 | (parts by weight) | 90 | 50 | 20 | 30 | 90 | 90 | 90 | 90 | 90 | 80 |
| 4,4'-Dihydroxybiphenyl diglycidyl ether *III-9 | (parts by weight) |  | 35 | 60 | 30 |  |  |  |  |  |  |
| Epoxy resin *III-10 | (parts by weight) |  |  |  | 40 |  |  |  |  |  | 5 |
| Brominated bisphenol A type epoxy resin (epoxy equivalent: 370, softening point: 65° C.) | (parts by weight) | 10 | 10 | 10 | 10 | 10 | 10 | 10 | 10 | 10 | 10 |
| Phenolic resin curing agent | | | | | | | | | | | |
| Silicone-modified phenol novolac resin III(a) | (parts by weight) | 70 | 70 |  |  |  |  |  |  |  | 10 |
| Silicone-modified phenol novolac resin III(b) | " |  |  | 70 |  |  |  |  |  |  |  |
| Silicone-modified phenol novolac resin III(c) | " |  |  |  | 50 |  |  |  |  |  |  |
| Silicone-modified phenol novolac resin III(d) | " |  |  |  |  | 70 |  |  |  |  |  |
| Silicone-modified phenol novolac resin III(e) | " |  |  |  |  |  | 70 |  |  |  |  |
| Silicone-modified phenol novolac resin III(f) | " |  |  |  |  |  |  | 70 |  |  |  |
| Silicone-modified phenol novolac resin III(g) | " |  |  |  |  |  |  |  | 70 |  |  |
| Silicone-modified phenol novolac resin III(h) | " |  |  |  |  |  |  |  |  | 70 |  |
| Phenolic novolac resin (OH equivalent: 105, softening point: (105° C.) | (parts by weight) |  |  |  |  |  |  |  |  |  | 50 |
| Phenolic resin *III-11 | (parts by weight) |  |  |  | 20 |  |  |  |  |  |  |
| Filler | | | | | | | | | | | |
| Crushed filler | (parts by weight) | 800 | 800 | 800 |  | 800 | 800 | 800 | 800 | 800 | 800 |
| Spherical filler | (parts by weight) |  |  |  | 1000 |  |  |  |  |  |  |
| Spiral flow (cm) *III-12 |  | 97 | 96 | 102 | 92 | 45 | 85 | 91 | 91 | 62 | 85 |
| Length of resin flash (mm) *III-13 |  | 0.5 | 0.4 | 0.6 | 0.5 | 0.6 | 5.3 | 0.6 | 4.2 | 0.5 | >10 |
| Flexural strength (kg/mm$^2$)/elastic modulus (kg/mm$^2$) *III-14 |  | 1450/15.5 | 1420/16.0 | 1420/15.9 | 1450/16.0 | 1440/16.0 | 1510/15.0 | 1450/16.1 | 1520/15.3 | 1490/15.5 | 1690/16.5 |
| Thermal expansion |  | 1.42 | 1.41 | 1.40 | 1.35 | 1.50 | 1.45 | 1.41 | 1.42 | 1.40 | 1.50 |

TABLE III-2-continued

|  | Example | | | | Comparative Example | | | | | |
|---|---|---|---|---|---|---|---|---|---|---|
|  | III-1 | III-2 | III-3 | III-4 | III-1 | III-2 | III-3 | III-4 | III-5 | III-6 |
| coefficient ($\times 10^{-5}/°C.$) *III-15 | | | | | | | | | | |
| Tg (°C.) *III-16 | 155 | 159 | 152 | 195 | 145 | 149 | 154 | 152 | 159 | 158 |
| Thermal impact resistance (number of cracked moldings) *III-17 | 0 | 0 | 0 | 0 | 2 | 2 | 5 | 2 | 4 | 10 |
| Soldering heat resistance (number of cracked moldings) *III-18 | 1 | 1 | 1 | 0 | 3 | 2 | 0 | 1 | 2 | 2 |
| Overall evaluation | ◯ | ◯ | ◯ | ◯ | Δ | X | Δ | X | Δ | X |

Evaluation methods
*III-12 Spiral flow
Measured by the same method as for *I-11.
*III-13 Length of resin flash
Measured by the same method as for *I-12.
*III-14 Flexural strength and elastic modulus
Measured by the same method as for *II-13.
*III-15 Thermal expansion coefficient
Measured by the same method as for *II-14.
*III-16 Tg (glass transition temperature)
Measured by the same method as for *II-15.
*III-17 Thermal impact resistance
Measured by the same method as for *I-15.
*III-18 Soldering heat resistance
Measured by the same method as for *II-17.

SYNTHESIS EXAMPLE IV

As shown in Tale IV-1, an organopolysiloxane (one or two of *IV-1 to *IV-7 shown later) was reacted with a phenol novolac resin (softening point=105° C., OH equivalent=105) in a solvent in the presence of a catalyst to obtain silicone-modified phenolic resins IV(a) to IV(h).

EXAMPLE IV-b 1

| Naphthalene type epoxy compound | 50 parts by weight |
|---|---|
| Biphenyl type epoxy compound A | 50 parts by weight |
| Brominated bisphenol A type epoxy resin (epoxy equivalent = 370, softening point = 65° C., bromine content = 37%) | 10 parts by weight |
| Silicone-modified phenol novolac resin IV(a) | 70 parts by weight |
| Crushed fused silica | 800 parts by weight |
| Antimony trioxide | 10 parts by weight |
| Silane coupling agent | 2 parts by weight |
| Triphenylphosphine | 2 parts by weight |
| Carbon black | 3 parts by weight |
| Carnauba wax | 3 parts by weight |

The above materials were mixed thoroughly at room temperature. The mixture was kneaded by a twin roll at 95-100° C. The kneaded product was cooled, crushed and made into tablets to obtain an epoxy resin composition for semiconductor sealing.

This material was made into a molding using a transfer molding machine (mold temperature=175° C., curing time =2 minutes). The molding was after-cured at 175° C. for 8 hours and examined for properties. The results are shown in Table IV-2.

EXAMPLES IV-2 to IV-4

Epoxy resin compositions whose compounding recipes are shown in Table IV-2 were obtained in the same manner as in Example IV-1.

These resin compositions were measured for properties, and the results are shown in Table IV-2.

COMPARATIVE EXAMPLES IV-b 1 to IV-6

Epoxy resin compositions whose compounding recipes are shown in Table IV-2 were obtained in the same manner as in Example IV-1.

These resin compositions were measured for properties, and the results are shown in Table IV-2.

Organopolysiloxane *IV-1

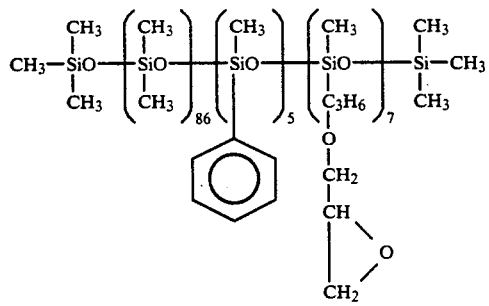

Organopolysiloxane *IV-2

-continued
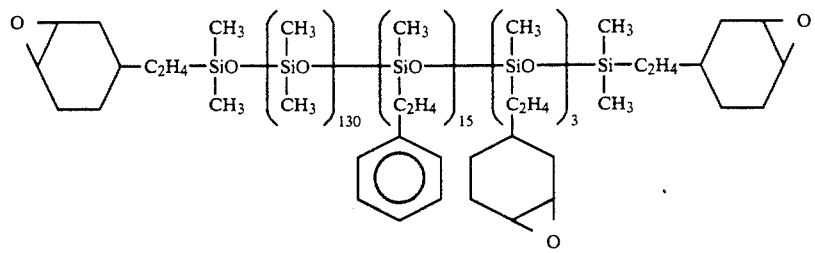
Organopolysiloxane *IV-3
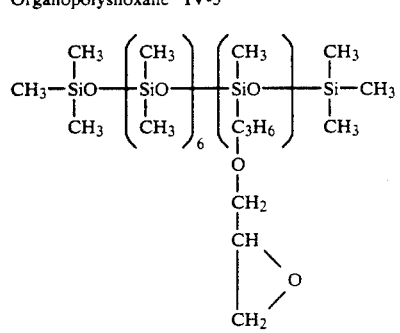
Organopolysiloxane *IV-4
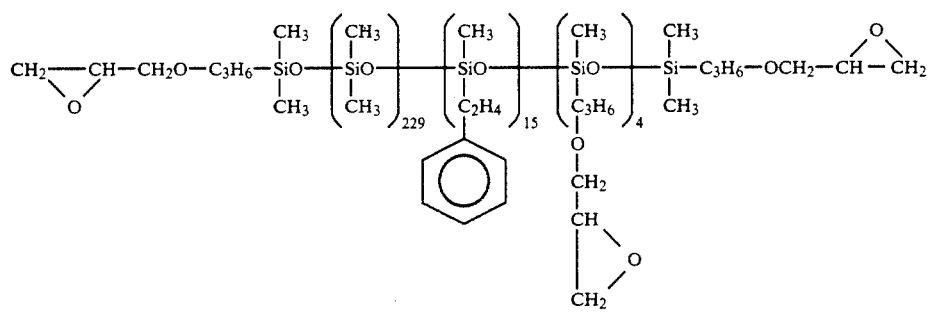
Organopolysiloxane *IV-5
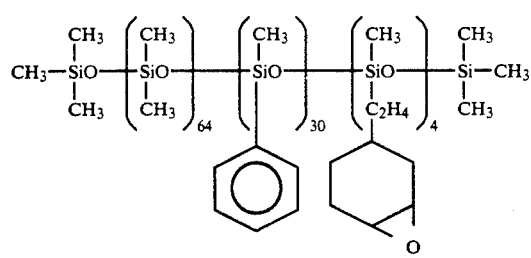
Organopolysiloxane *IV-6
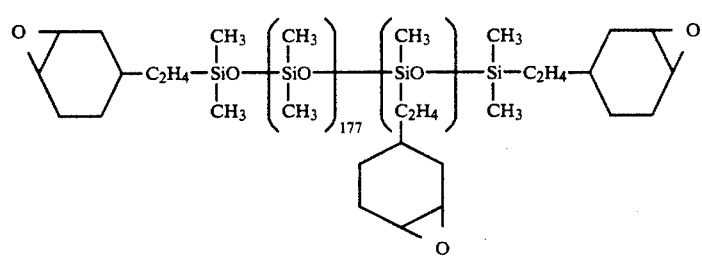
Organopolysiloxane *IV-7

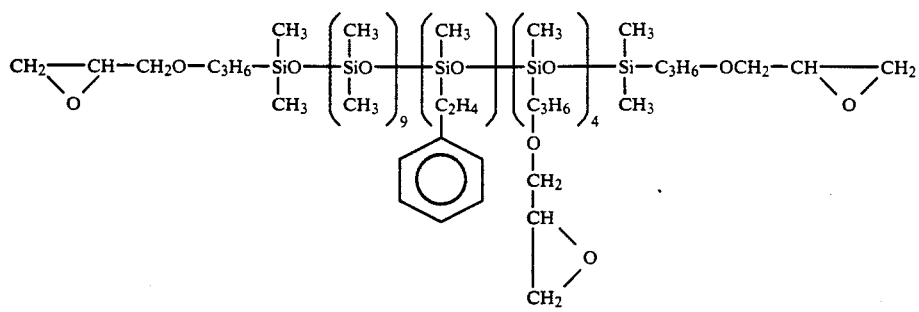

*IV-8 Naphthalene type epoxy compound represented by the following formula (epoxy equivalent = 151)

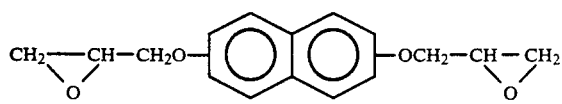

*IV-9 Biphenyl type epoxy compound A represented by the following formula (epoxy equivalent = 185)

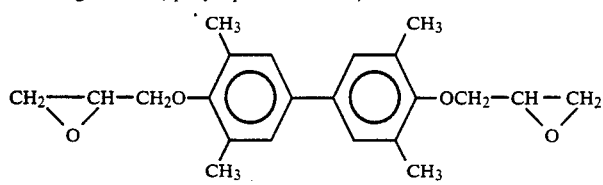

*IV-10 Biphenyl type epoxy compound B represented by the following formula (epoxy equivalent = 155)

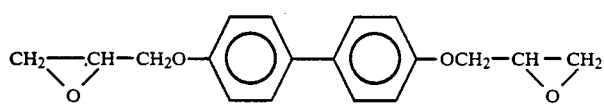

*IV-11 Epoxy resin represented by the following formula

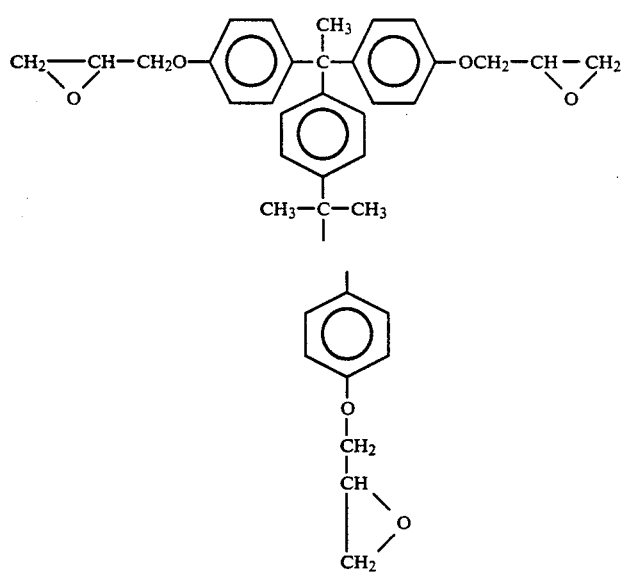

*IV-12 Phenolic resin represented by the following formula

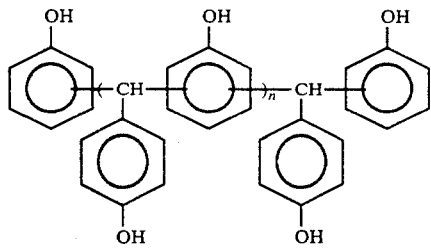

n = 0 ~ 9

TABLE IV-1

|  | Silicone-modified phenolic resin IV(a) | Silicone-modified phenolic resin IV(b) | Silicone-modified phenolic resin IV(c) | Silicone-modified phenolic resin IV(d) | Silicone-modified phenolic resin IV(e) | Silicone-modified phenolic resin IV(f) | Silicone-modified phenolic resin IV(g) | Silicone-modified phenolic resin IV(h) |
|---|---|---|---|---|---|---|---|---|
| Raw materials | | | | | | | | |
| Phenolic resin | | | | | | | | |
| Phenol novolac resin (OH equivalent: 105, softening point: 105° C.) (parts by weight) | 100 | 100 | 100 | 100 | 100 | 100 | 100 | 100 |
| Silicone | | | | | | | | |
| Organopolysiloxane *IV-1 (parts by weight) | 30 | | 10 | | | | | |
| Organopolysiloxane *IV-2 (parts by weight) | | 30 | 20 | | | | | |
| Organopolysiloxane *IV-3 (parts by weight) | | | | 30 | | | | |
| Organopolysiloxane *IV-4 (parts by weight) | | | | | 30 | | | |
| Organopolysiloxane *IV-5 (parts by weight) | | | | | | 30 | | |
| Organopolysiloxane *IV-6 (parts by weight) | | | | | | | 30 | |
| Organopolysiloxane *IV-7 (parts by weight) | | | | | | | | 30 |
| N (polymerization degree of siloxane) | 100 | 150 | — | 9 | 250 | 100 | 180 | 16 |
| m/N (molar fraction of phenyl group or phenylethyl group) | 0.05 | 0.1 | — | 0 | 0.05 | 0.30 | 0 | 0.06 |
| N/n (siloxane polymerization degree/number of functional groups) | 14.3 | 30 | — | 9 | 41.6 | 25 | 60 | 2.7 |
| Reaction conditions | | | | | | | | |
| Kind of solvent | Toluene | Toluene | Toluene | Toluene | Toluene | Toluene | Toluene | Toluene |
| Amount of solvent (parts by weight) | 200 | 200 | 200 | 200 | 250 | 200 | 200 | 200 |
| Kind of catalyst | Triphenyl-phosphine | Triphenyl-phosphine | Triphenyl-phosphine | Triphenyl-phosphine | Triphenyl-phosphine | Triphenyl-phosphine | Triphenyl-phosphine | Triphenyl-phosphine |
| Amount of catalyst (parts by weight) | 2 | 2 | 3 | 2 | 2 | 3.5 | 3 | 2.5 |
| Reaction temperature (°C.) | 100 | 100 | 100 | 100 | 100 | 100 | 100 | 100 |
| Reaction time (hr) | 5 | 5 | 7 | 7 | 7 | 5 | 5 | 5 |
| Properties | | | | | | | | |
| Hydroxyl group equivalent (g/eq) | 136 | 138 | 138 | 135 | 136 | 140 | 140 | 137 |
| Softening point (°C.) | 104 | 107 | 110 | 106 | 105 | 108 | 110 | 106 |

TABLE IV-2

|  | Example | | | | Comparative Example | | | | | |
|---|---|---|---|---|---|---|---|---|---|---|
|  | IV-1 | IV-2 | IV-3 | IV-4 | IV-1 | IV-2 | IV-3 | IV-4 | IV-5 | IV-6 |
| Epoxy resin | | | | | | | | | | |
| Naphthalene type epoxy compound *IV-8 (parts by weight) | 50 | 50 | 30 | 25 | 50 | 50 | 50 | 50 | 50 | 40 |
| Biphenyl type epoxy compound A *IV-9 (parts by weight) | 50 | | 50 | 10 | 20 | 20 | 20 | 20 | 20 | |
| Biphenyl type epoxy compound B *IV-10 (parts by weight) | | 40 | 20 | 20 | 30 | 30 | 30 | 30 | 30 | 40 |
| Epoxy resin *IV-11 (parts by weight) | | | | 40 | | | | | | 5 |
| Brominated bisphenol A type epoxy resin (epoxy equivalent: 370, softening point: 65° C.) (parts by weight) | 10 | 10 | 10 | 10 | 10 | 10 | 10 | 10 | 10 | 10 |

TABLE IV-2-continued

|  | Example | | | | Comparative Example | | | | | |
| --- | --- | --- | --- | --- | --- | --- | --- | --- | --- | --- |
|  | IV-1 | IV-2 | IV-3 | IV-4 | IV-1 | IV-2 | IV-3 | IV-4 | IV-5 | IV-6 |
| Phenolic resin curing agent | | | | | | | | | | |
| Silicone-modified phenol novolac resin IV(a) (parts by weight) | 70 | | | | | | | | | 10 |
| Silicone-modified phenol novolac resin IV(b) (parts by weight) | | 70 | | 30 | | | | | | |
| Silicone-modified phenol novolac resin IV(c) (parts by weight) | | | 70 | 10 | | | | | | |
| Silicone-modified phenol novolac resin IV(d) (parts by weight) | | | | | 70 | | | | | |
| Silicone-modified phenol novolac resin IV(e) (parts by weight) | | | | | | 70 | | | | |
| Silicone-modified phenol novolac resin IV(f) (parts by weight) | | | | | | | 70 | | | |
| Silicone-modified phenol novolac resin IV(g) (parts by weight) | | | | | | | | 70 | | |
| Silicone-modified phenol novolac resin IV(h) (parts by weight) | | | | | | | | | 70 | |
| Phenol novolac resin (OH equivalent: 105, softening point: 105° C.) (parts by weight) | | | | | | | | | | 50 |
| Phenolic resin *IV-12 (parts by weight) | | | | 30 | | | | | | |
| Filler | | | | | | | | | | |
| Crushed filler (parts by weight) | 800 | 800 | 800 | | 800 | 800 | 800 | 800 | 800 | 800 |
| Spherical filler (parts by weight) | | | | 1000 | | | | | | |
| Spiral flow (cm) *IV-13 | 95 | 96 | 101 | 99 | 45 | 85 | 90 | 89 | 60 | 85 |
| Length of resin flash (mm) *IV-14 | 0.5 | 0.4 | 0.4 | 0.4 | 0.6 | 5.3 | 0.6 | 5.0 | 0.5 | >10 |
| Flexural strength (kg/mm$^2$)/elastic modulus (kg/mm$^2$) *IV-15 | 1400/16.0 | 1420/16.2 | 1430/15.9 | 1450/16.0 | 1450/15.5 | 1510/15.8 | 1450/16.1 | 1520/15.3 | 1490/15.5 | 1700/16.5 |
| Thermal expansion coefficient ($10^{-5}$/°C.) *IV-16 | 1.40 | 1.41 | 1.38 | 1.35 | 1.50 | 1.38 | 1.41 | 1.42 | 1.40 | 1.45 |
| Tg (°C.) *IV-17 | 155 | 160 | 152 | 155 | 145 | 149 | 156 | 152 | 159 | 158 |
| Thermal impact resistance (number of cracked moldings) *IV-18 | 0 | 0 | 0 | 0 | 3 | 4 | 5 | 2 | 4 | 20 |
| Soldering heat resistance (number of cracked moldings) *IV-19 | 0 | 0 | 1 | 0 | 4 | 4 | 0 | 1 | 2 | 2 |
| Overall evaluation | ○ | ○ | ○ | ○ | Δ | X | Δ | X | Δ | X |

Evaluation methods
*IV-13 Spiral flow
Measured by the same method as for *I-11.
*IV-14 Length of resin flash
Measured by the same method as for *I-12.
*IV-15 Flexural strength and elastic modulus
Measured by the same method as for *II-13.
*IV-16 Thermal expansion coefficient
Measured by the same method as for *II-14.
*IV-17 Tg (glass transition temperature)
Measured by the same method as for *II-15.
*IV-18 Thermal impact resistance
Measured by the same method as for *I-15 except that the number of cycles was increased to 1,000.
*IV-19 Soldering heat resistance
20 Moldings (chip size = 36 mm$^2$, package thickness = 2.0 mm) were treated in steam of 85° C. and 85% R.H. for 72 hours, and the resulting moldings were subjected to an infrared reflow treatment at 240° C. to examine the soldering heat resistance by the number of moldings which gave crack(s).

SYNTHESIS EXAMPLE V

As shown in Table V-1, an organopolysiloxane (one or two of *V-1 to *V-7 shown later) was reacted with a phenol novolac resin (softening point=105° C., OH equivalent=105) in a solvent in the presence of a catalyst to obtain silicone-modified phenolic resins V(a) to V(h).

EXAMPLE V-1

| Biphenyl type epoxy resin A *V-8 | 40 parts by weight |
| --- | --- |
| Trifunctional epoxy resin *V-10 | 50 parts by weight |
| Brominated bisphenol A type epoxy resin (epoxy equivalent = 370, softening point = 65° C., bromine content = 37%) | 10 parts by weight |
| Silicone-modified phenol novolac resin V(a) | 70 parts by weight |
| Crushed fused silica | 500 parts by weight |
| Antimony trioxide | 10 parts by weight |
| Silane coupling agent | 2 parts by weight |
| Triphenylphosphine | 2 parts by weight |
| Carbon black | 3 parts by weight |
| Carnauba wax | 3 parts by weight |

The above materials were mixed thoroughly at room temperature. The mixture was kneaded by a twin roll at 95-100° C. The kneaded product was cooled, crushed and made into tablets to obtain an epoxy resin composition for semiconductor sealing.

This material was made into a molding using a transfer molding machine (mold temperature=175° C., curing time=2 minutes). The molding was after-cured at 175° C. for 8 hours and examined for properties. The results are shown in Table V-2.

EXAMPLE V-2

An epoxy resin composition for semiconductor sealing was obtained in the same manner as in Example V-1 except that the biphenyl type epoxy resin A was changed to a biphenyl type epoxy resin B (*V-9) and the silicone-modified phenol novolac resin V(a) was changed to a silicone-modified phenol novolac resin V(b).

The resin composition was examined for properties, and the results are shown in Table V-2.

EXAMPLE V-3

An epoxy resin composition for semiconductor sealing whose compounding recipe is shown in Table V-2, was obtained in the same manner as in Example V-1.

The resin composition was examined for properties, and the results are shown in Table V-2.

COMPARATIVE EXAMPLE V-1 to V-6

Epoxy resin compositions for semiconductor sealing whose compounding recipes are shown in Table V-2, were obtained in the same manner as in Example V-1.

The resin compositions were examined for properties, and the results are shown in Table V-2.

Organopolysiloxane *V-1

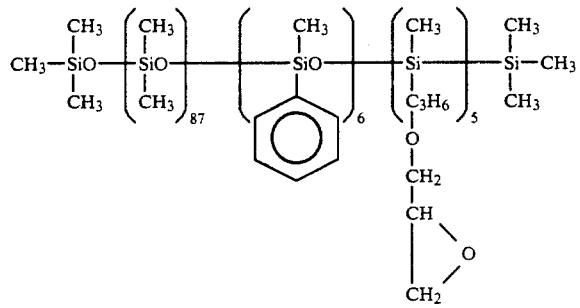

Organopolysiloxane *V-2

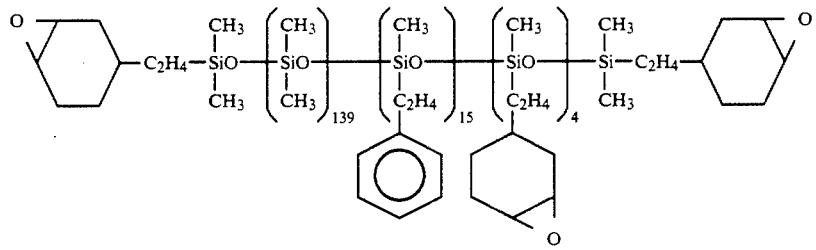

Organopolysiloxane *V-3

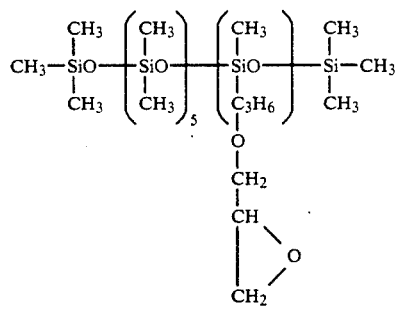

Organopolysiloxane *V-4

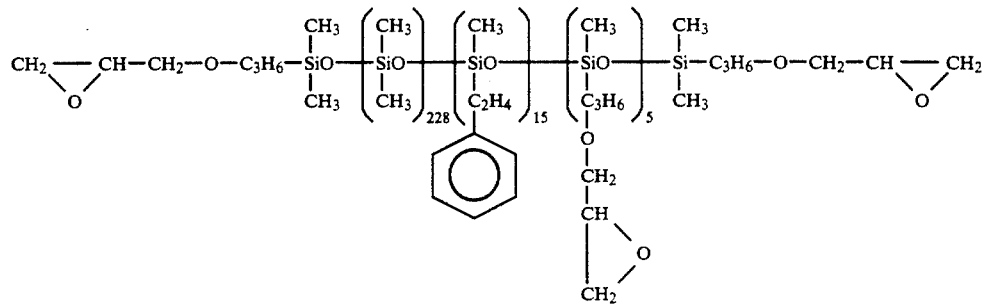

Organopolysiloxane *V-5

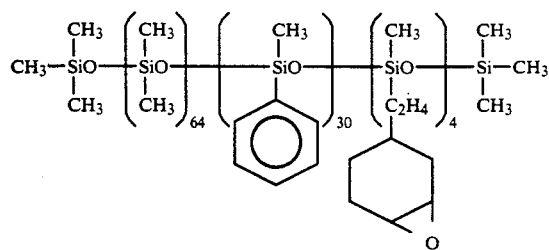
Organopolysiloxane *V-6
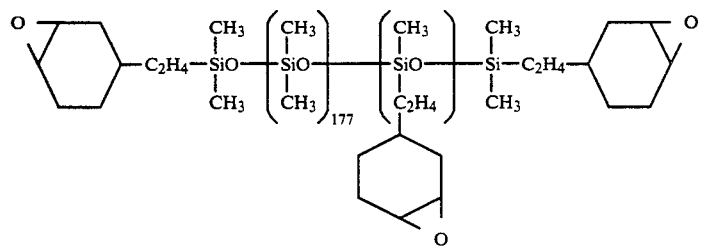
Organopolysiloxane *V-7
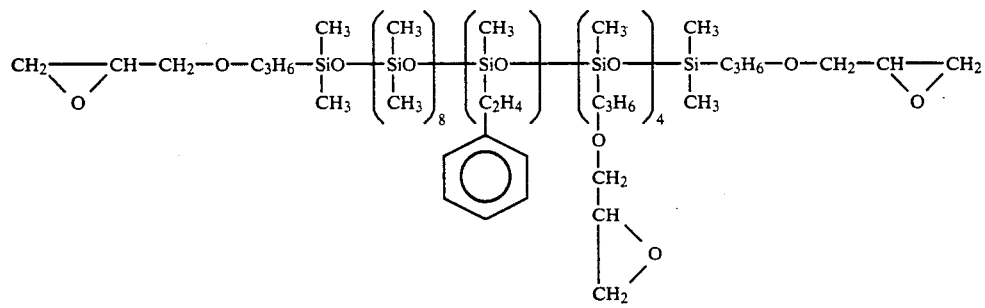
*V-8 Biphenyl type epoxy resin A represented by the
following formula (epoxy equivalent = 185)
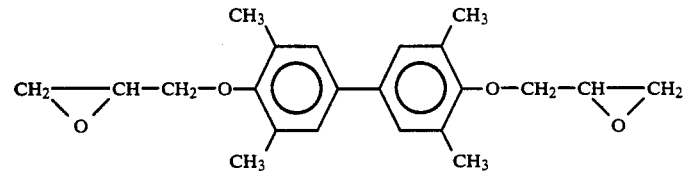
*V-9 Biphenyl type epoxy resin B represented by the following formula
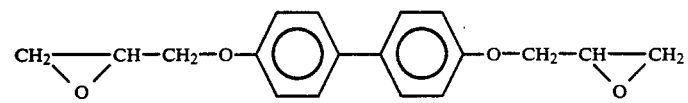
*V-10 Epoxy resin represented by the following formula -continued

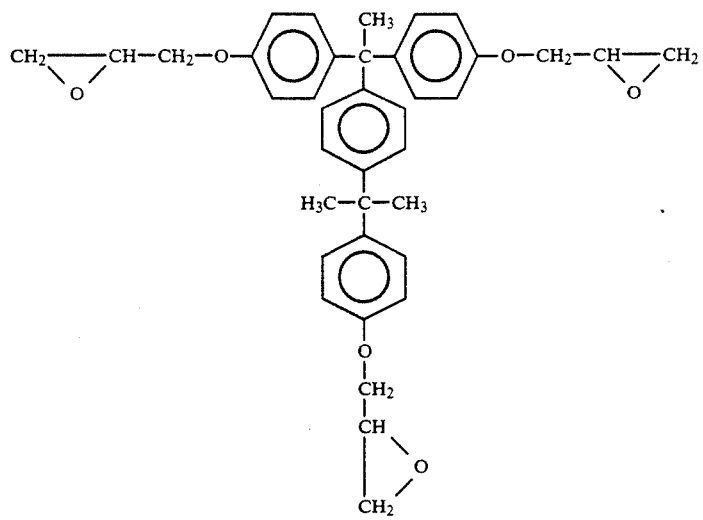

TABLE V-1

| | Silicone-modified phenolic resin V(a) | Silicone-modified phenolic resin V(b) | Silicone-modified phenolic resin V(c) | Silicone-modified phenolic resin V(d) | Silicone-modified phenolic resin V(e) | Silicone-modified phenolic resin V(f) | Silicone-modified phenolic resin V(g) | Silicone-modified phenolic resin V(h) |
|---|---|---|---|---|---|---|---|---|
| Raw materials | | | | | | | | |
| Phenolic resin  Phenol novolac resin (OH equivalent: 105, softening point: 105° C.) (parts by weight) | 100 | 100 | 100 | 100 | 100 | 100 | 100 | 100 |
| Silicone | | | | | | | | |
| Organopolysiloxane *V-1 (parts by weight) | 30 | | 10 | | | | | |
| Organopolysiloxane *V-2 (parts by weight) | | 30 | 20 | | | | | |
| Organopolysiloxane *V-3 (parts by weight) | | | | 30 | | | | |
| Organopolysiloxane *V-4 (parts by weight) | | | | | 30 | | | |
| Organopolysiloxane *V-5 (parts by weight) | | | | | | 30 | | |
| Organopolysiloxane *V-6 (parts by weight) | | | | | | | 30 | |
| Organopolysiloxane *V-7 (parts by weight) | | | | | | | | 30 |
| N (polymerization degree of siloxane) | 100 | 160 | — | 8 | 250 | 100 | 180 | 15 |
| m/N (molar fraction of phenyl group or phenylethyl group) | 0.06 | 0.094 | — | 0 | 0.06 | 0.30 | 0 | 0.07 |
| N/n (siloxane polymerization degree/number of functional groups) | 20 | 26.7 | — | 8 | 35.7 | 25 | 60 | 2.5 |
| Reaction conditions | | | | | | | | |
| Kind of solvent | Toluene | Toluene | Toluene | Toluene | Toluene | Toluene | | |
| Amount of solvent (parts by weight) | 200 | 200 | 200 | 230 | 250 | 200 | | |
| Kind of catalyst | Triphenylphosphine | Triphenylphosphine | Triphenylphosphine | Triphenylphosphine | Triphenylphosphine | Triphenylphosphine | | |
| Amount of catalyst (parts by weight) | 3 | 3 | 3 | 3 | 3 | 3 | | |
| Reaction temperature (°C.) | 100 | 100 | 100 | 100 | 100 | 100 | | |
| Reaction time (hr) | 5 | 5 | 7 | 5 | 7 | 5 | | |
| Properties | | | | | | | | |
| Hydroxyl group equivalent (g/eq) | 137 | 138 | 139 | 138 | 136 | 140 | | |
| Softening point (°C.) | 106 | 107 | 110 | 107 | 106 | 108 | | |

TABLE V-1-continued

|  | | |
|---|---|---|
| of functional groups) Reaction conditions | | |
| Kind of solvent | Toluene | Toluene |
| Amount of solvent (parts by weight) | 200 | 200 |
| Kind of catalyst | Triphenyl-phosphine | Triphenyl-phosphine |
| Amount of catalyst (parts by weight) | 3 | 3 |
| Reaction temperature (°C.) | 100 | 100 |
| Reaction time (hr) | 5 | 5 |
| Properties | | |
| Hydroxyl group equivalent (g/eq) | 136 | 138 |
| Softening point (°C.) | 111 | 106 |

TABLE V-2

|  | Example | | | Comparative Example | | | | | |
|---|---|---|---|---|---|---|---|---|---|
|  | V-1 | V-2 | V-3 | V-1 | V-2 | V-3 | V-4 | V-5 | V-6 |
| Composition | | | | | | | | | |
| Biphenyl type epoxy resin A *V-8 (parts by weight) | 40 |  | 30 | 40 | 40 | 40 | 40 | 40 | 40 |
| Biphenyl type epoxy resin B *V-9 (parts by weight) |  | 50 | 15 |  |  |  |  |  |  |
| Trifunctional epoxy resin *V-10 (parts by weight) | 50 | 50 | 50 | 50 | 50 | 50 | 50 | 50 | 50 |
| o-Cresol novolac epoxy resin (epoxy equivalent: 205, softening point: 70° C.) (parts by weight) |  |  | 5 |  |  |  |  |  |  |
| Brominated bisphenol A type epoxy resin (epoxy equivalent: 370, softening point: 65° C.) (parts by weight) | 10 | 10 | 10 | 10 | 10 | 10 | 10 | 10 | 10 |
| Silicone-modified phenol novolac resin V(a) (parts by weight) | 70 |  |  |  |  |  |  |  | 15 |
| Silicone-modified phenol novolac resin V(b) (parts by weight) |  | 70 |  |  |  |  |  |  |  |
| Silicone-modified phenol novolac resin V(c) (parts by weight) |  |  | 65 |  |  |  |  |  |  |
| Silicone-modified phenol novolac resin V(d) (parts by weight) |  |  |  | 70 |  |  |  |  |  |
| Silicone-modified phenol novolac resin V(e) (parts by weight) |  |  |  |  | 70 |  |  |  |  |
| Silicone-modified phenol novolac resin V(f) (parts by weight) |  |  |  |  |  | 70 |  |  |  |
| Silicone-modified phenol novolac resin V(g) (parts by weight) |  |  |  |  |  |  | 70 |  |  |
| Silicone-modified phenol novolac resin V(h) (parts by weight) |  |  |  |  |  |  |  | 70 |  |
| Phenol novolac resin (OH equivalent: 105, softening point: 110° C.) (parts by weight) |  |  | 5 |  |  |  |  |  | 40 |
| Properties | | | | | | | | | |
| Spiral flow (cm) *V-11 | 90 | 95 | 98 | 60 | 95 | 90 | 94 | 54 | 95 |
| Length of resin flash (mm) *V-12 | 0.5 | 0.4 | 0.3 | 0.6 | 5.0 | 0.5 | 5.2 | 0.4 | 5.2 |
| Mold staining *V-13 | ○ | ○ | ○ | ○ | X | ○ | X | ○ | X |
| Koka type flow viscosity (poises) *V-14 | 231 | 230 | 245 | 410 | 221 | 220 | 230 | 415 | 220 |
| Thermal impact resistance (number of cracked moldings) *V-15 | 0 | 0 | 0 | 3 | 4 | 5 | 2 | 4 | 15 |
| Soldering heat resistance (number of cracked moldings) *V-16 | 0 | 1 | 0 | 4 | 4 | 0 | 1 | 2 | 2 |
| Overall evaluation | ○ | ○ | ○ | Δ | X | Δ | X | Δ | X |

Evaluation methods
*V-11 Spiral flow
Measured by the same method as for *I-11.
*V-12 Length of resin flash
Measured by the same method as for *I-12.
*V-13 Mold staining
Mold staining after 1,000 shots of molding was examined visually.
*V-14 Koka type flow viscosity
A Koka type flow viscosity (poises) at 175° C.
*V-15 Thermal impact resistance
Measured by the same method as for *I-15.
*V-16 Soldering heat resistance
Measured by the same method as for *II-17.

We claim:

1. An epoxy resin composition for semiconductor sealing, comprising an essential components:

(A) an epoxy resin comprising 30-100% by weight, based on the total amount of the epoxy resin, of at least one epoxy compound selected from the group consisting of naphthalene epoxy compounds represented by the following formula and biphenyl epoxy compounds represented by the following formula:

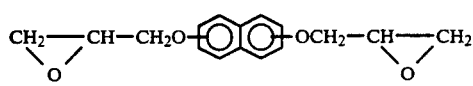

[III]

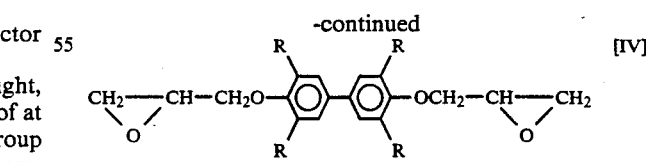

[IV]

wherein R is H or $CH_3$, (B) a phenolic resin curing agent comprising 30-100% by weight, based on the total amount of the phenolic resin curing agent, of a silicone-modified phenolic resin curing agent obtained by reacting a phenolic resin with at least one of silicone compounds represented by the following formulas and:

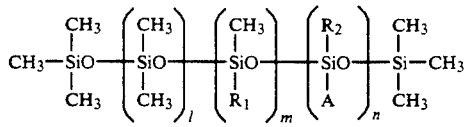  [I]

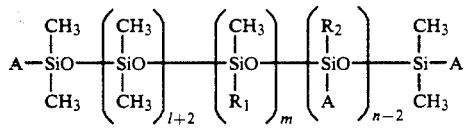  [II]

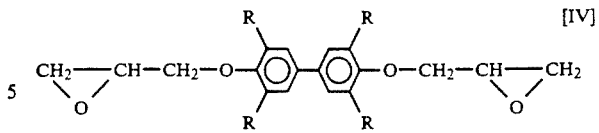  [IV]

wherein R:H or CH$_3$, and a trifunctional epoxy resin represented by the following formula:

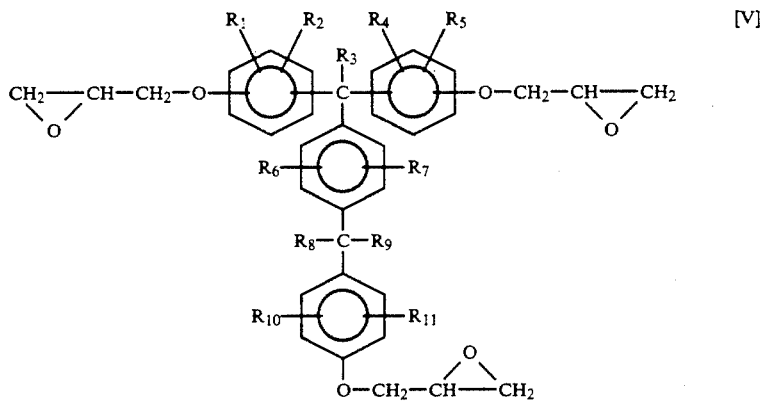  [V]

wherein R$_1$ to R$_{11}$ are each an atom or atomic group selected from hydrogen, halogens or alkyl groups, (B) a phenolic resin curing agent comprising 30–100% by weight, based on the total amount of the phenolic resin curing agent, of a silicone-modified phenolic resin curing agent obtained by reacting a phenolic resin with at least one of silicone compounds represented by the following formulas and:

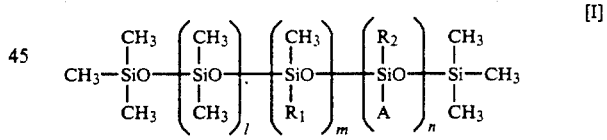  [I]

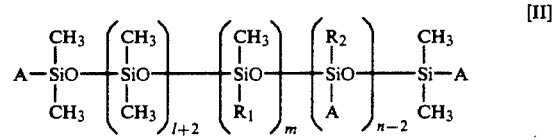  [II]

wherein

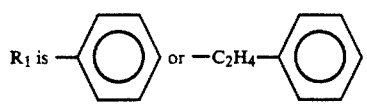

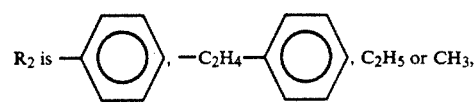

A is —R—COOH, wherein

R$_1$ = 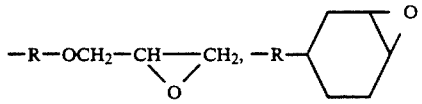

R$_2$ = ![R2 structure], C$_2$H$_5$ or CH$_3$,

A is —R—COOH,

—R—OCH$_2$—CH—CH$_2$, —R—cyclohexyl epoxide
 \O/ or H,

R is a lower alkylene group, $10 \leq N = l + m + n + 2 \leq 200$, $0 \leq m/N \leq 0.1$, and $5 \leq N/n \leq 50$, (C) 70–90% by weight of an inorganic filler based on the total weight of the composition, and (D) a curing accelerator.

2. An epoxy resin composition for semiconductor sealing, comprising as essential components:

(A) an epoxy resin comprising 50–100% by weight, based on the total amount of the epoxy resin, of a mixture of a biphenyl epoxy resin represented by the following formula:

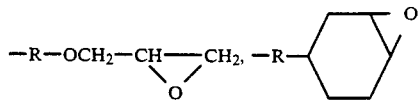

or H,
R is a lower alkylene group,
$10 \leq N = 1 + m + n + 2 \leq 200$,
$0 \leq m/N \leq 0.1$, and $5 \leq N/n \leq 50$,
(C) an inorganic filler, and
(D) a curing accelerator.

3. An epoxy resin composition according to claim 2, wherein in the formulas and representing the silicone compounds,

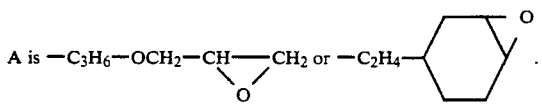

4. An epoxy resin composition according to claim 2 wherein the phenolic resin curing agent comprises the silicone-modified phenolic resin curing agent in an amount of 50-100% by weight based on the total amount of the phenolic resin curing agent.

5. An epoxy composition according to claim 2 wherein the epoxy resin (A) has an epoxy equivalent of 150-250 and a softening point of 60-130° C. and is selected from the group consisting of bisphenol A epoxy resins, bisphenol F epoxy resins, phenol novolac epoxy resins, cresol novolac epoxy resins and alicyclic epoxy resins.

6. An epoxy resin composition according to claim 2, wherein the phenolic rein has a hydroxyl group equivalent of 80-150 and a softening point of 60-120° C. and is selected from the group consisting of phenol novolac resins, cresol novolac resins and resins obtained by modifying them.

7. An epoxy resin composition according to claim 2, wherein the silicone-modified phenolic resin curing agent is obtained by reacting 100 parts by weight of the phenolic resin with 10-50 parts by weight of at least one of the silicone compounds.

8. An epoxy resin composition according to claim 2, wherein the epoxy resin (A) and the phenolic resin curing agent (B) are compounded at a ratio of 70/100 to 100/70 in terms of epoxy group/phenolic hydroxyl group.

9. An epoxy resin composition according to claim 2, wherein the inorganic filler (C) is selected from the group consisting of crystalline silica, fused silica, alumina, calcium carbonate, talc, mica and glass fiber.

10. An epoxy resin composition according to claim 2, wherein the curing accelerator (D) is selected from the group consisting of tertiary amines, imidazoles, 1,8-diazabicyclo[5.5.0]undecene-7 and organophophorus compounds.

11. An epoxy resin composition according to claim 1, wherein the epoxy resin (A) comprises the naphthalene epoxy compound and the biphenyl epoxy compound at a weight ratio of 10/90 to 90/10.

12. An epoxy resin composition according to claim 2, wherein the epoxy resin (A) comprises the biphenyl epoxy compound and the trifunctional epoxy compound at a weight ratio of 10/90 to 90/10.

13. An epoxy resin composition according to claim 1, wherein in the formulas [I] and [II] representing the silicone compounds,

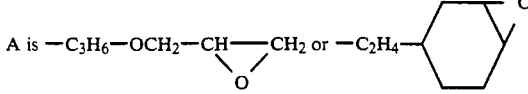

14. An epoxy resin composition according to claim 1, wherein the phenolic resin curing agent comprises the silicone-modified phenolic resin curing agent in an amount of 50-100% by weight based on the total amount of the phenolic resin curing agent.

15. An epoxy resin composition according to claim 1, wherein the epoxy resin (A) has an epoxy equivalent of 150-250 and a softening point of 60-130° C. and is selected from the group consisting of bisphenol A epoxy resins, bisphenol F epoxy resins, phenol novolac epoxy resins, cresol novolac epoxy resins and alicyclic epoxy.

16. An epoxy resin composition according to claim 2, wherein in the formula [V] representing the trifunctional epoxy resin, $R_1$, $R_2$, $R_4$ to $R_7$, $R_{10}$ and $R_{11}$ are each hydrogen atom, and $R_3$, $R_8$ and $R_9$ are each methyl group.

17. An epoxy resin composition according to claim 1, wherein the phenolic resin has a hydroxyl group equivalent of 80-150 and a softening point of 60-120° C. and is selected from the group consisting of phenol novolac resins, cresol novolac resins and resins obtained by modifying them.

18. An epoxy resin composition according to claim 1, wherein the silicone-modified phenolic resin curing agent is obtained by reacting 100 parts by weight of the phenolic resin with 10-50 parts by weight of at least one of the silicone compounds.

19. An epoxy resin composition according to claim 1, wherein the epoxy resin (A) and the phenolic resin curing agent (B) are compounded at a ratio of 70/100 to 100/70 in terms of epoxy group/phenolic hydroxyl group.

20. An epoxy resin composition according to claim 1, wherein the inorganic filler (C) is selected from the group consisting of crystalline silica, fused silica, alumina, calcium carbonate, talc, mica and glass fiber.

21. An epoxy resin composition according to claim 1, wherein the curing accelerator (D) is selected from the group consisting of tertiary amines, imidazoles, 1,8-diazabicyclo[5.4.0]undecene-7 and organophosphorus compounds.

22. An epoxy resin composition for semiconductor sealing, consisting essentially of:
(A) an epoxy resin having either of the following structures:

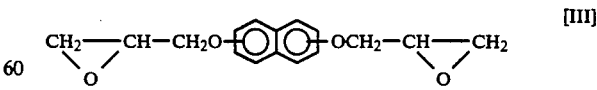

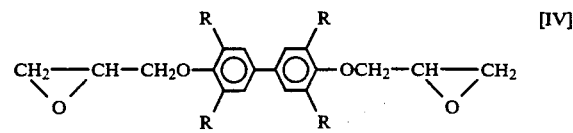

wherein R is H or $CH_3$, (B) a phenolic resin curing agent having either of the following formulas:
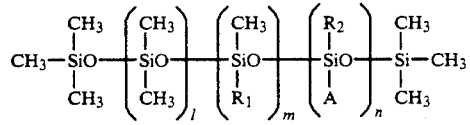 [I]
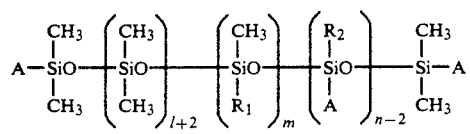 [II]
wherein
$R_1$ is 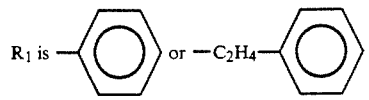
$R_2$ is 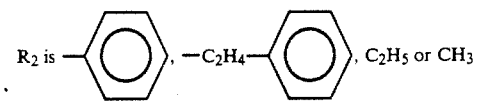
A is —R—COOH,
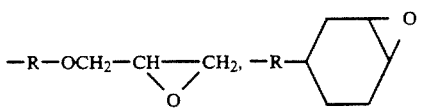
or H,
R is lower alkylene group,
$10 \leq N = l+m+n+2 \leq 200$,
$0 \leq m/N \leq 0.1$, and $5 \leq N/n \leq 50$,
(C) an inorganic filler, and
(D) a curing accelerator.
* * * * *